United States Patent
Ishii et al.

(10) Patent No.: US 7,542,197 B2
(45) Date of Patent: Jun. 2, 2009

(54) SPATIAL LIGHT MODULATOR FEATURED WITH AN ANTI-REFLECTIVE STRUCTURE

(75) Inventors: Fusao Ishii, Menlo Park, CA (US); Yoshihiro Maeda, Hachioji (JP); Hirotoshi Ichikawa, Hchioji (JP); Kazuhiro Watanabe, Hachioji (JP); Yoshiaki Horikawa, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 11/827,552

(22) Filed: Jul. 11, 2007

(65) Prior Publication Data
US 2008/0013157 A1    Jan. 17, 2008

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/830,171, filed on Jul. 12, 2006.

(51) Int. Cl.
*G02B 26/00* (2006.01)
*G02B 26/08* (2006.01)
*G02F 1/29* (2006.01)

(52) U.S. Cl. .................. 359/290; 359/291; 359/298

(58) Field of Classification Search .............. 359/290, 359/291, 292, 295, 298
See application file for complete search history.

(56) References Cited

U.S. PATENT DOCUMENTS
6,958,846 B2 * 10/2005 Huibers et al. .............. 359/291

FOREIGN PATENT DOCUMENTS
JP           02003086835 A  *  9/2001

* cited by examiner

*Primary Examiner*—Scott J Sugarman
*Assistant Examiner*—Brandi N Thomas
(74) *Attorney, Agent, or Firm*—Bo-In Lin

(57) ABSTRACT

A spatial light modulator supported on a device substrate includes a plurality of light modulation elements to modulate a light emitted from a light source. The spatial light modulator and the device substrate further comprises a cyclic structure on a surface of the spatial light modulator and/or the device substrate for preventing a reflection of the incident light from the cyclic structure. In an exemplary embodiment the cyclic structure includes cyclic structural elements having a distance between two cyclic elements shorter than the wavelength of an incident light for preventing a reflection of the incident light from the cyclic structure.

14 Claims, 20 Drawing Sheets

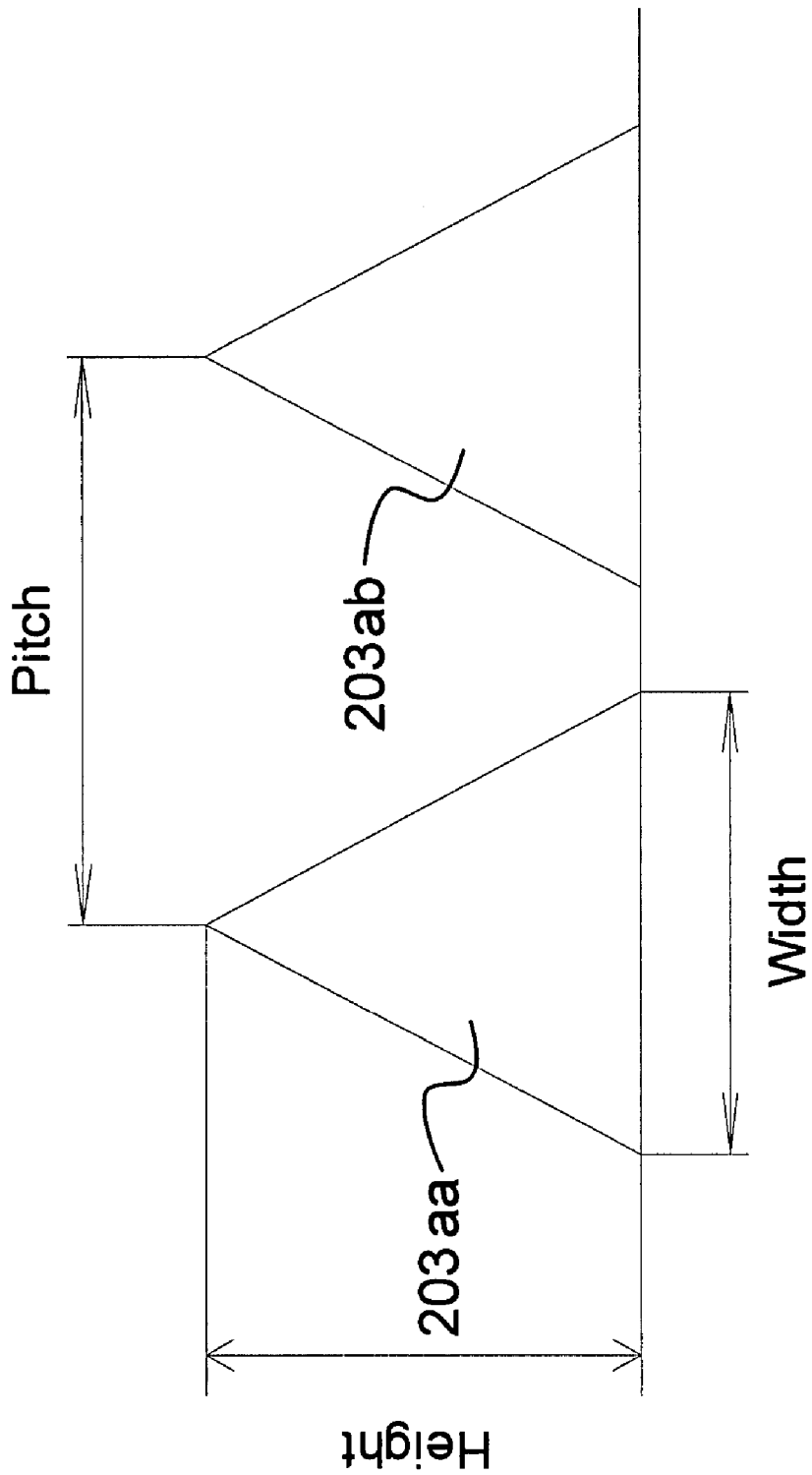

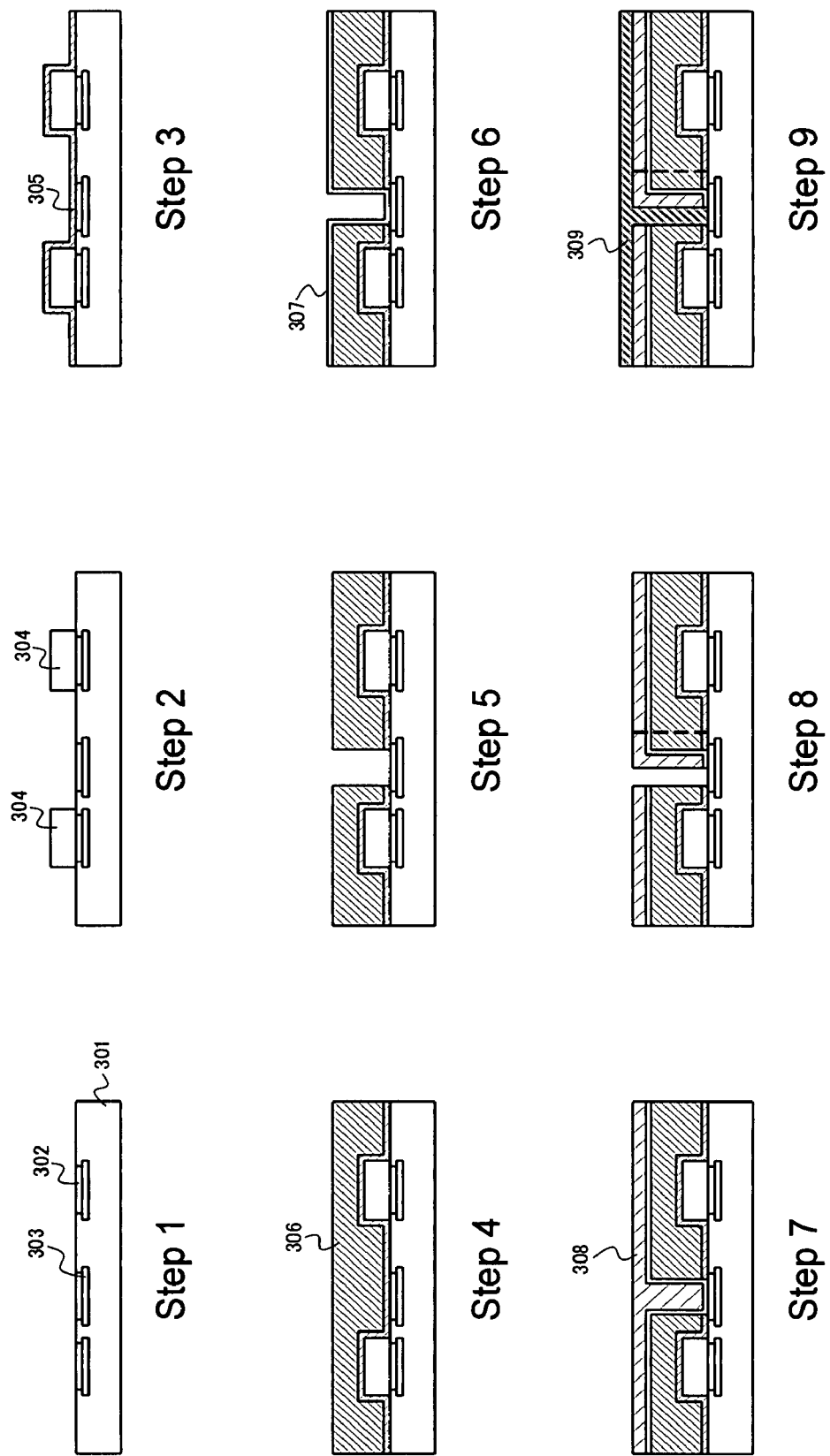

Step 10

Step 11

Step 12

Step 13

SPATIAL LIGHT MODULATOR FEATURED WITH AN ANTI-REFLECTIVE STRUCTURE

CROSS REFERENCE TO RELATED APPLICATIONS

This application is a Non-provisional application of a Provisional Application 60/830,171 filed on Jul. 12, 2006. The Provisional Application 60/830,171 is a Continuation In Part (CIP) Application of U.S. patent application Ser. No. 11/121, 543 filed on May 4, 2005 now U.S Pat. No. 7,268,932. The application Ser. No. 11/121,543 is a Continuation In Part (CIP) application of three previously filed Applications. These three applications are Ser. No. 10/698,620 filed on Nov. 1, 2003, Ser. No. 10/699,140 filed on Nov. 1, 2003 now U.S. Pat. No. 6,862,127, and Ser. No. 10/699,143 filed on Nov. 1, 2003 now U.S. Pat. No. 6,903,860 by the Applicant of this patent applications. The disclosures made in these patent Applications are hereby incorporated by reference in this patent application.

BACKGROUND OF THE INVENTION

1. Field of the Invention

The present invention relates to an image display system. More particularly, the present invention relates to an image display apparatus with one or more spatial light modulators that include microstructures shorter than wavelength of an incident light for enhancing the contrast of an image.

2. Description of the Related Arts

Even though there are significant advances of the technologies implementing an electromechanical mirror device as a spatial light modulator (SLM) in recent years, there are still limitations and difficulties when it is employed to provide a high quality image. Specifically, when the images are digitally controlled, the image quality is adversely affected due to the fact that the images are not displayed with sufficient number of gray scales.

An electromechanical mirror device is drawing a considerable interest as a spatial light modulator (SLM). The electromechanical mirror device consists of "a mirror array" arranging a large number of mirror elements. In general, the mirror elements from 60,000 to several millions are arranged on a surface of a substrate in an electromechanical mirror device. Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array arranging switchable reflective elements 17, 27, 37, and 47 being consisted of a mirror 33 connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is not redirected toward screen 2 and hence the pixel 3 is dark.

Each of mirror elements constituting a mirror device to function as a spatial light modulator (SLM) and each mirror element comprises a mirror and electrodes. A voltage applied to the electrode(s) generates a coulomb force between the mirror and the electrode, thereby making it possible to control and incline the mirror and the mirror is "deflected" according to a common term used in this specification for describing the operational condition of a mirror element.

When a mirror is deflected with a voltage applied to the electrodes to control mirror, the deflected mirror also changes the direction of the reflected light in reflecting an incident light. The direction of the reflected light is changed in accordance with the deflection angle of the mirror. The present specification refers to a state of the mirror when a light of which almost the entirety of an incident light is reflected to a projection path designated for image display as an "ON light", while referring to a light reflected to a direction other than the designated projection path for image display as an "OFF light".

And a state of the mirror that reflects a light of an incident light in a manner that the ratio of the light reflected to a projection path (i.e., the ON light) and that reflected so as to shift from the projection path (i.e., the OFF light) is a specific ratio, that is, the light reflected to the projection path with a smaller quantity of light than the state of the ON light is referred to as an "intermediate light".

According to a convention of present specification, it defines an angle of rotation along a clockwise (CW) direction as a positive (+) angle and that of counterclockwise (CCW) direction as negative (−) angle. A deflection angle is defined as zero degree ("0°") when the mirror is in the initial state, as a reference of mirror deflection angle.

Most of the conventional image display devices such as the devices disclosed in U.S. Pat. No. 5,214,420 implement a dual-state mirror control that controls the mirrors at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines on the basis of the gray scale, is the light reflected during the time duration according to the least pulse width. The limited gray scale leads to a degradation of the image.

Specifically, FIG. 1C shows an exemplary control circuit for controlling a mirror element according to the disclosures made in U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based of a Static Random Access Switch Memory (SRAM) design. The transistor M9 connected to a Row-line receives a DATA signal via a Bit-line. The memory cell 32 written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The mirror is driven by a voltage applied to the electrode abutting a landing electrode and is held at a predetermined deflection angle on the landing electrode. An elastic "landing chip" is formed at a portion on the landing electrode, which makes the landing electrode contact with mirror, and assists the operation for deflecting the mirror toward the opposite direction when a deflection of the mirror is switched. The landing chip is designed as having the same potential with the landing electrode, so that a shorting is prevented when the landing electrode is in contact with the mirror.

Each mirror formed on a device substrate has a square or rectangular shape and each side has a length of 4 to 15 um. In this configuration, a reflected light that is not controlled for purposefully applied for image display is however inadvertently generated by reflections through the gap between adjacent mirrors. The contrast of image display generated by adjacent mirrors is degraded due to the reflections generated not by the mirrors but by the gaps between the mirrors. As a result, a quality of the image display is worsened. In order to overcome such problems, the mirrors are arranged on a semiconductor wafer substrate with a layout to minimize the gaps between the mirrors. One mirror device is generally designed to include an appropriate number of mirror elements wherein each mirror element is manufactured as a deflectable micromirror on the substrate for displaying a pixel of an image. The appropriate number of elements for displaying image is in compliance with the display resolution standard according to a VESA Standard defined by Video Electronics Standards Association. Alternately, the number in compliance with the television broadcast standards. In the case in which the mirror device has a plurality of mirror elements corresponding to WXGA (resolution: 1280 by 768) defined by VESA, the pitch between the mirrors of the mirror device is 10 um and the diagonal length of the mirror array is about 0.6 inches.

The control circuit as illustrated in FIG. 1C controls the micromirrors to switch between two states and the control circuit drives the mirror to oscillate to either an ON or OFF deflected angle (or position) as shown in FIG. 1A.

The minimum quantity of light controllable to reflect from each mirror element for image display, i.e., the resolution of gray scale of image display for a digitally controlled image display apparatus, is determined by the least length of time that the mirror controllable to hold at the ON position. The length of time that each mirror is controlled to hold at an ON position is in turn controlled by multiple bit words. FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n bits word for controlling the gray scale, one frame time is divided into $(2^n-1)$ equal time slices. If one frame time is 16.7 msec, each time slice is $16.7/(2^n-1)$ msec.

Having set these time lengths for each pixel in each frame of the image, the quantity of light in a pixel which is quantified as 0 time slices is black (no the quantity of light), 1 time slice is the quantity of light represented by the LSB, and 15 time slices (in the case of n=4) is the quantity of light represented by the maximum brightness. Based on quantity of light being quantified, the time of mirror holding at the ON position during one frame period is determined by each pixel. Thus, each pixel with a quantified value which is more than 0 time slices is displayed by the mirror holding at an ON position with the number of time slices corresponding to its quantity of light during one frame period. The viewer's eye integrates brightness of each pixel so that the image is displayed as if the image were generated with analog levels of light.

For controlling deflectable mirror devices, the PWM calls for the data to be formatted into "bit-planes", where each bit-plane corresponds to a bit weight of the quantity of light. Thus, when the brightness of each pixel is represented by an n-bit value, each frame of data has the n-bit-planes. Then, each bit-plane has a 0 or 1 value for each mirror element. In the PWM described in the preceding paragraphs, each bit-plane is independently loaded and the mirror elements are controlled according to bit-plane values corresponding to them during one frame. For example, the bit-plane representing the LSB of each pixel is displayed as 1 time slice.

When adjacent image pixels are displayed with a very coarse gray scales caused by great differences of quantity of light, thus, artifacts are shown between these adjacent image pixels. That leads to the degradations of image qualities. The degradations of image qualities are specially pronounced in bright areas of image when there are "bigger gaps" of gray scale, i.e. quantity of light, between adjacent image pixels. The artifacts are caused by a technical limitation that the digitally controlled image does not obtain sufficient number of the gray scale, i.e. the levels of the quantity of light.

The mirrors are controlled either at ON or OFF position. Then, the quantity of light of a displayed image is determined by the length of time each mirror holds, which is at the ON position. In order to increase the number of the levels of the quantity of light, the switching speed of the ON and OFF positions for the mirror must be increased. Therefore the digital control signals need be increased into a higher number of bits. However, when the switching speed of the mirror deflection is increased, a stronger hinge for supporting the mirror is necessary to sustain a required number of switches of the ON and OFF positions for the mirror deflection. Furthermore, in order to drive the mirrors provided strengthened hinge toward the ON or OFF positions, applying a higher voltage to the electrode is required. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of higher number of the gray scale, a more complicated production process and larger device areas are required to produce the DMOS mirror. Conventional mirror controls are therefore faced with a technical problem that the good accuracy of gray scales and range of the operable voltage have to be sacrificed for the benefits of a smaller image display apparatus.

There are many patents related to the control of quantity of light. These patents include U.S. Pat. Nos. 5,589,852, 6,232, 963, 6,592,227, 6,648,476, and 6,819,064. There are further patents and patent applications related to different sorts of light sources. These patents include U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, an invention has disclosed a method for controlling the deflection angle of the mirror to express higher gray scales of an image in a US Patent Application 20050190429. In this disclosure, the quantity of light obtained during the oscillation period of the mirror is about 25% to 37% of the quantity of light obtained during the mirror is held on the ON position at all times.

According to such control, it is not particularly necessary to drive the mirror at high speed. Also, it is possible to provide a higher number of the gray scale using a low elastic constant of the hinge that supports the mirror. Hence, such control makes it possible to reduce the voltage applied to the landing electrode.

An image display apparatus using the mirror device described above is broadly categorized into two types, i.e. a single-plate image display apparatus equipped with only one spatial light modulator and a multi-plate image display apparatus equipped with a plurality of spatial light modulators. In the single-plate image display apparatus, a color image is displayed by changing in turn the color, i.e. frequency or wavelength of projected light is changed by time. In a multi-plate the image display apparatus, a color image displayed by allowing the spatial light modulators corresponding to beams of light having different colors, i.e. frequencies or wavelengths of the light, to modulate the beams of light; and combined with the modulated beams of light at all times.

In the single-plate image display apparatus and multi-plate image display apparatus, a configuration is such that the light illuminates a wider zone than the array of spatial light modulators (SLMs). As a result, it is possible to display a bright and uniform image across an entire image. Such a configuration, however, allows the reflection light from parts illuminated by other than the arrayed light modulator elements (e.g., mirrors) to incident to the projection lens. As a result, the contrast of the image is degraded.

Also, the light arriving at a substrate from a gap between the adjacent light modulation elements is reflected on the substrate to become an unnecessary reflection light. And the unnecessary reflection light entering the projection path decreases the contrast of an image.

An improvement of the image is an important problem of an image display apparatus, for which various contrivances are devised for spatial light modulators (SLMs) to solve the problem.

There is a method for layering a light absorption mask on a part other than the array of light modulator elements of a spatial light modulator (SLM) or forming a light absorption layer on light modulation elements. Such a configuration prevents an unnecessary reflection light from entering the projection path.

As an example, in a mirror device arraying a plurality of deflectable mirror elements as light modulation elements, formed is an anti-reflection layer or light absorption layer on the surface other than the reflection surface of the mirror, such as the back thereof and the top surface of the substrate retaining the mirror. Meanwhile, in a spatial light modulator (SLM) employing a liquid crystal as light modulation element, formed is an anti-reflection layer or light absorption layer in the components not contributing to an image generation, such as a transistor and the wall surface between the liquid crystal elements.

In order to make the anti-reflection layer as described above function effectively to an incident light possessing a wide wavelength band, however, a plurality of layers with different thick nesses must be formed. This consequently is faced with the problem of increasing the number of producing processes. On the other hand, a coating of a black material that is the simplest method for forming a light absorption layer is difficult to apply to a micro electro mechanical system (MEMS) device possessing a very minute structure. As an example, there is a problem associated with the process for depositing a thin layer of carbon black in a specific place.

Note that there are following disclosure related to the problem described above.

1. B. S. Thornton, "Limit of the moth's eye principle and other impedance-matching corrugations for solar-absorber design", JOURNAL OF THE OPTICAL SOCIETY OF AMERICA VOLUME65, NUMBER3, MARCH 1975, 267-270.
2. S. J. WILSON and M. C. HUTLEY, "The optical properties of 'moth eye' antireflection surfaces", OPTICA ACTA, 1982, Vol. 29, No. 7, 993-1009
3. Eric B. Grann, M. G. Moharam, and A. Pommet, "Optimal design for antireflective tapered two-dimensional sub wavelength grating structures", OPTICAL SOCIETY OF AMERICA Vol. 12, No. 2, February 1995, 333-339
4. Philippe Lalanne and G Michael Morris, "Antireflection behavior of silicon subwavelength periodic structures for visible light", Nanotechnology, 8, 1997, 53-56
5. Yuzo Ono, Yasuo Kimura, Yoshinori Ohta, and Nobuo Nishida, "Antireflection effect in ultrahigh spatial-frequency holographic relief gratings", APPLIED OPTICS, Vol. 26, No. 6, 15 Mar. 1987, 1142-1146 [Japan Patent Application] 2003-294910A, Sanyo Electric Co., Ltd. [Japan Patent Application] 2001-27505, Japan Science and Technology Agency

SUMMARY OF THE INVENTION

One aspect of the present invention is to provide a spatial light modulator (SLM) having a mirror surface formed with a cyclic structure which is shorter than a wavelength of an incident light for reducing a reflecting light other than the modulating portion of a light reflected from the SLM and a package for accommodating the spatial light modulator.

Another aspect of the present invention is to provide a spatial light modulator (SLM) or a package for a spatial light modulator (SLM) with an anti-reflective structure. Also, the present invention discloses an image display apparatus that implements the antireflective structure both on the SLM and on the package to prevent unnecessary light reflection such that the display quality is improved with better contrast because the interferences from the unnecessary reflecting light is reduced.

Another aspect of the present invention is to provide a spatial light modulator that includes a device substrate for retaining a light modulation element modulating an incident light emitted from a light source, comprising a structural body having a cycle shorter than the wavelength of the incident light at least on either of a surface of the device substrate, of at least a part of the light modulation element or of at least a part of a package accommodating the device substrate.

Another aspect of the present invention is to provide an image display apparatus comprising a spatial light modulator modulating an incident light emitted from a light source, comprising a structural body having a cycle shorter than the wavelength of the incident light at least on either of a surface of the device substrate, of at least a part of the light modulation element constituting the spatial light modulator, of at least a part of a package accommodating the spatial light modulator or surfaces of optical members placed between the light source and a projection lens.

Another aspect of the present invention is to provide a production method of the spatial light modulator noted in the first aspect, featuring the structural body having a cycle shorter than the wavelength of the incident light by either of imprinting method, etching method or sol-gel method.

The aspects of the present invention noted above make it possible to prevent a degradation of the contrast of an image caused by the unnecessary reflection light.

These and other aspects and advantages of the present invention will no doubt become obvious to those of ordinary skill in the art after having read the following detailed description of the preferred embodiment, which is illustrated in the various drawing figures

BRIEF DESCRIPTION OF THE DRAWINGS

FIG. 9D shows a vertical cross-sectional diagram of adjacent ridges having a cyclical triangular vertical section structure which is featured in one- and two-dimensional structures;

FIG. 10A shows an example of the producing process of a mirror device having an anti-reflection structure;

DESCRIPTION OF THE PREFERRED EMBODIMENTS

According to above briefly described drawings, the inventions included in this patent application are illustrated by preferred embodiments of a spatial light modulator featured with an anti-reflection structure, of a package accommodating the spatial light modulator, and of an image display apparatus that includes the aforementioned components. Exemplary embodiments may include the spatial light modulator that is a transmissive liquid crystal device (LCD), a reflective liquid crystal of silicon (LCOS) or a mirror device. In the following descriptions, a spatial light modulator is used to exemplify the mirror devices, however, other types of mirror devices may also be applied to implement the reflective structural features disclosed in the present invention.

Figure 1A:
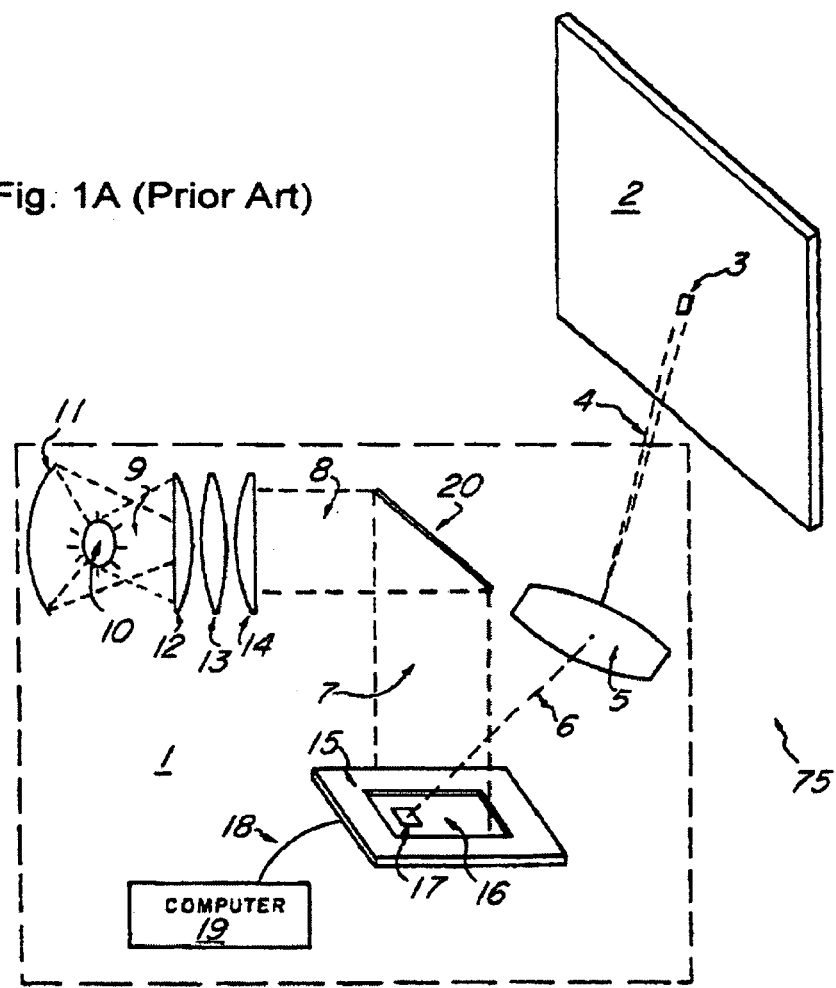
FIG. 1A shows a constitution of a conventional image display system with a spatial light modulator (SLM).
Figure 1B:
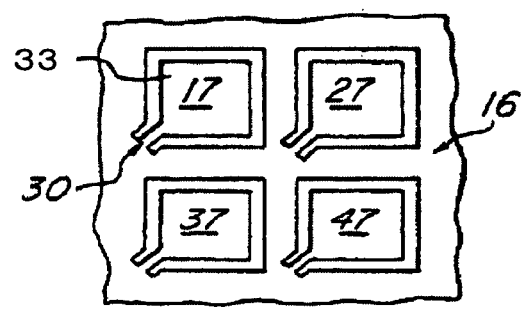
FIG. 1B shows a constitution and a control of a spatial light modulator as shown FIG. 1A.
Figure 1C:
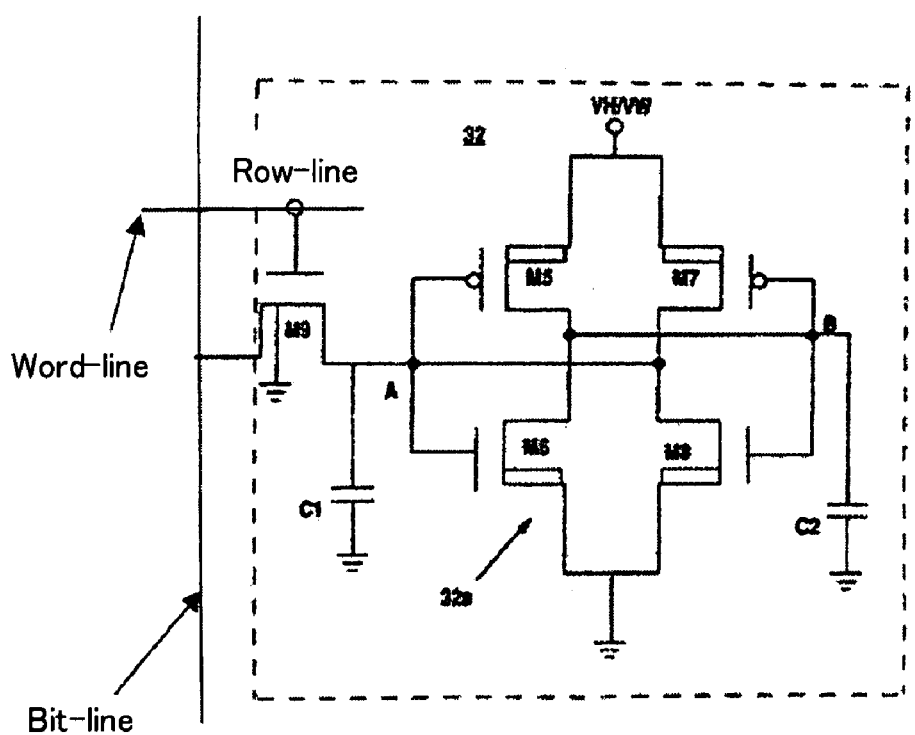
FIG. 1C shows an exemplary control circuit for a mirror element.
Figure 1D:
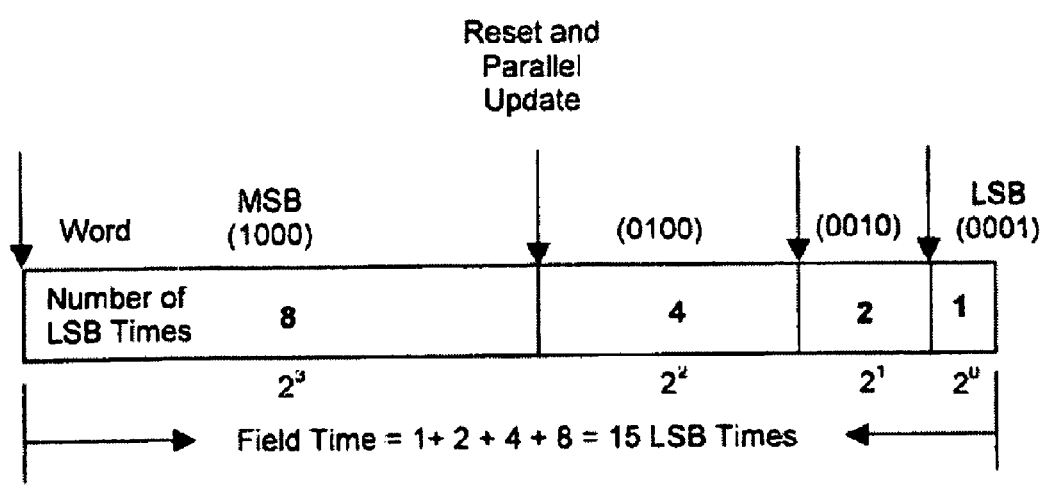
FIG. 1D shows the "binary time periods" in the case of controlling SLM by four bit words.
Figure 2:
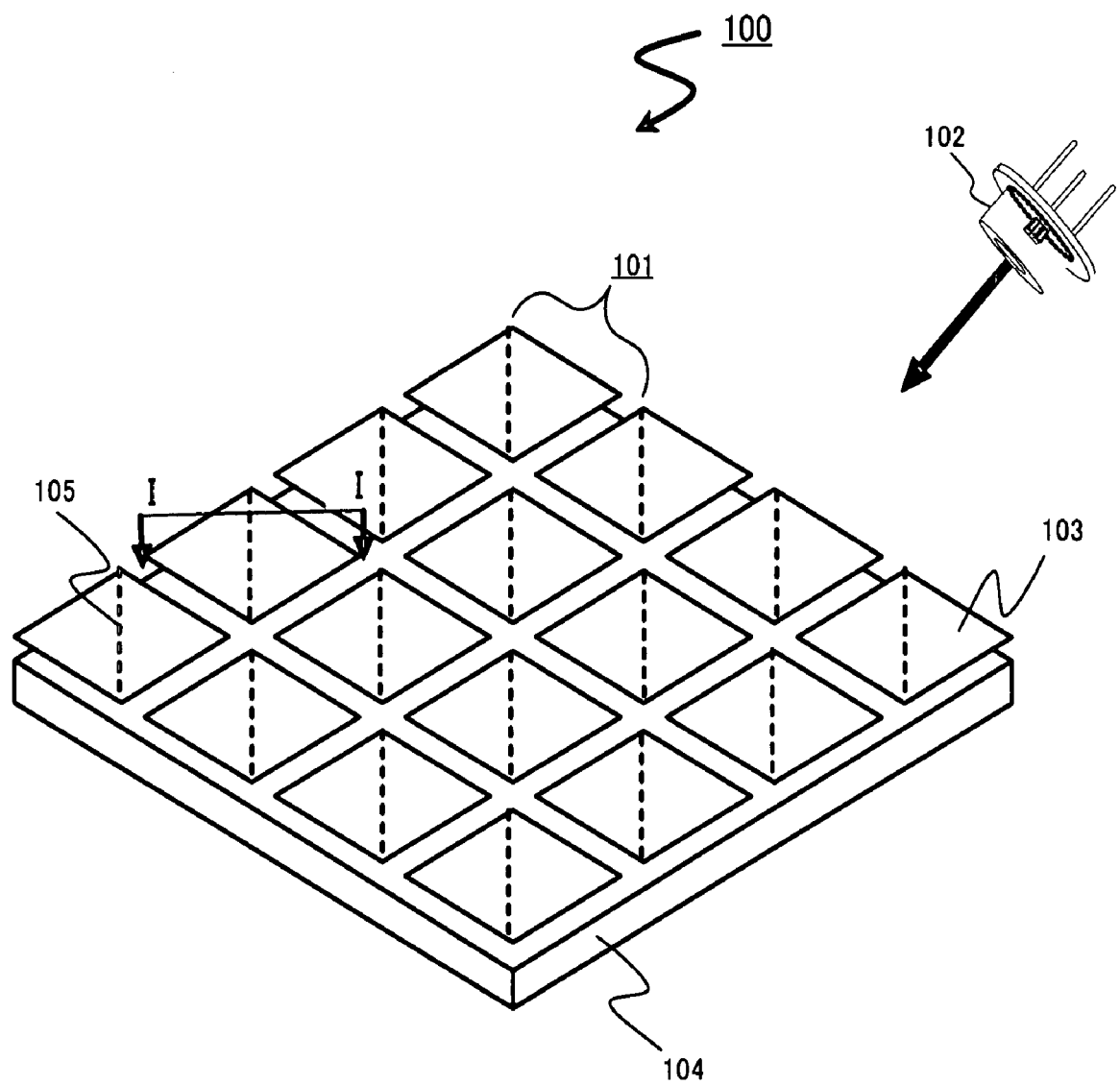
FIG. 2 is a diagonal view diagram of a spatial light modulator Arraying, on a device substrate, a plurality of mirror elements controlling a reflection direction of an incident light by deflecting a mirror.

FIG. 2 is a diagram of showing diagonal view of a spatial light modulator that includes a plurality of mirror elements disposed on a device substrate as a mirror array for controlling a reflection direction of an incident light by controlling the deflecting angle of a mirror. The mirror device 100 comprises a plurality of mirror elements 101 disposed on a device substrate controlled by an electrode (not shown in a drawing herein) and supported on an elastic hinge (not shown in a drawing herein). A mirror 103 that is supported by an elastic hinge is shown in FIG. 2. Particularly in FIG. 2, mirror elements 101 are arrayed in a square matrix at regular intervals on the device substrate and each mirror element includes a square mirror 103 and a dotted line represents the deflecting axis for the mirror 103. The light emitted from a light source 102 in the vertical direction or diagonal direction in relation to the deflection axis 105 is incident to the mirror 103. Also, a voltage applied to an electrode supported on the device substrate 104 controls the mirror 103 of one mirror element 101. The mirror pitch between adjacent mirrors 103 is preferably between 4 to 15 m. The "mirror pitch" refers to the distance between the deflection axes 105 of the adjacent mirrors 103. A "mirror gap" refers to the distance between edges of the adjacent mirrors 103. The shape of the mirror 103 or the mirror gap and mirror pitch between the adjacent mirrors may be flexibly adjusted to satisfy application specific requirements.

Figure 3A:
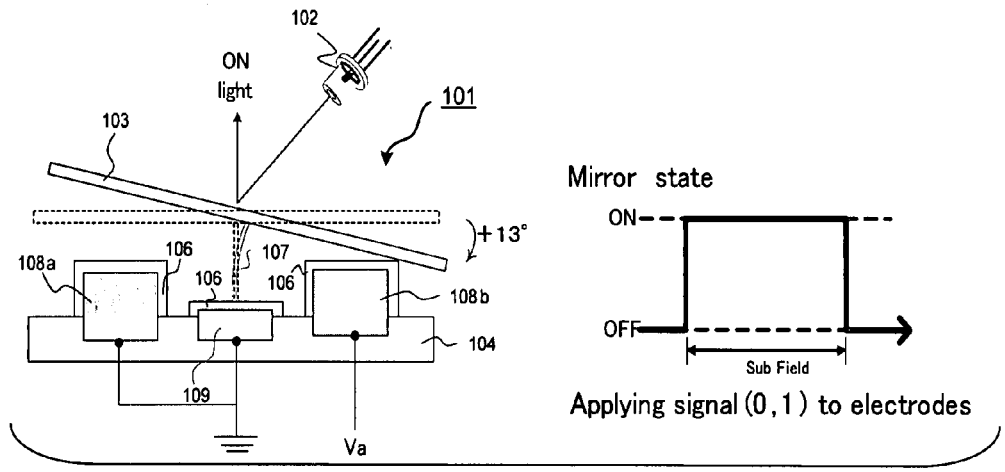
FIG. 3A is a cross-section diagram of a mirror element showing a situation of reflecting an incident light to a projection path by deflecting a mirror.

The operation of the deflection of the mirror 103 of the mirror element 101 is described below by referring to the cross-sectional diagram of a single mirror element 101 across the line. -I over the mirror device 100 as shown in FIG. 2. FIG. 3A is the cross-section diagram of the mirror element 100 across the line I-I shown in FIG. 2. FIG. 3 illustrates the mirror configuration of reflecting an incident light to a projection path by deflecting a mirror.

A control signal (0,1) is provided to a memory cell (not shown in a drawing herein) to apply a voltage of "0" volt to a electrode 108a, and to apply a voltage Ve volts to a electrode 108b, as illustrated in FIG. 3A. As a result, the mirror 103 is deflected from a deflection angle of "0" degree to an angular position of +13 degrees toward the electrode 108b. The angular movement of the mirror is generated through a coulomb force when a voltage Ve volts is applied to the electrode 108b. The deflected mirror 103 reflects the incident light to the projection path (i.e., an ON light state). It is noted that an insulation layer 106 is deposited on the device substrate 104. A hinge electrode 109 is electrically connected, and grounded, to the elastic hinge 107 through an electric connection penetrating through the insulation layer 106.

Figure 3B:
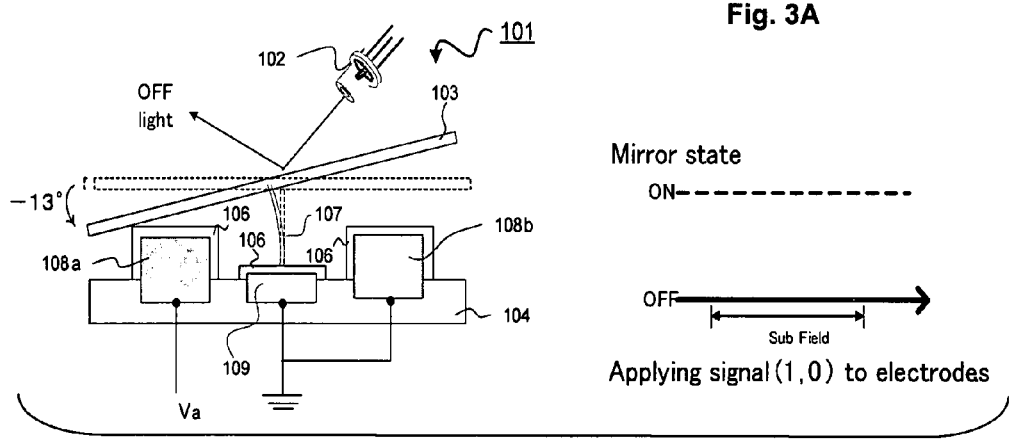
FIG. 3B is a cross-section diagram of a mirror element showing a situation of not reflecting an incident light to a projection path by deflecting a mirror.

FIG. 3B shows a cross-sectional view of the mirror element 100 across the line I-I as that shown in FIG. 2 to illustrate the mirror configuration when a deflecting mirror reflects an incident light away from a projection path for image display.

A control signal (1,0) is provided to a memory cell (not shown in a drawing herein) to apply a voltage of Ve volts to a electrode 108a, and a voltage of "0" volt is applied to a electrode 108b as illustrated in FIG. 3B. As a result, the mirror 103 is deflected from a deflection angle of "0" degree to an angular position of −13 degrees toward the electrode 108a. The angular movement of the mirror is generated through a coulomb force when the voltage of Ve volts is applied to the electrode 108a. The deflected mirror 103 reflects the incident light away from the projection path (i.e., an OFF light state).

Figure 3C:
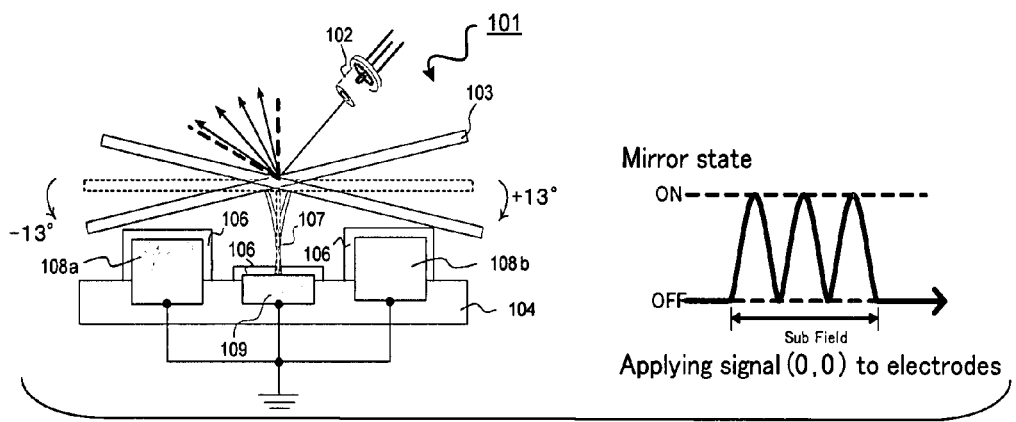
FIG. 3C is a cross-section diagram of a mirror element showing a situation of reflecting an incident light to a projection path with an intermediate quantity of light by making a mirror oscillate freely.

FIG. 3C shows a cross-sectional view of the mirror element 101 across the line I-I as that shown in FIG. 2 to illustrate the mirror configuration when a deflecting mirror freely oscillates thus continuously repeating the ON-OFF cycles of the reflected light from the oscillating mirror projecting to and then away from the image projection path.

A control signal (0,0) is provided to a memory cell (not shown in a drawing herein) to apply "0" volt to both of the electrodes 108a and 108b. The control signal (0,0) may be applied when the mirror 103 is deflected in either of the states shown in FIG. 3A or 3B. As a result, the Coulomb force generated between the mirror 103 and the electrode is removed thus allowing the mirror 103 to freely oscillate within the range of plus and minus 13 degrees in accordance with the characteristic of the elastic hinge 107. Depending on the free oscillation of the mirror 103, the incident light is reflected to the projection path only in the range of a deflection angle in which the mirror becomes the ON state. Therefore, the mirror 103 oscillates between the ON light state and OFF light state continuously. A control of the number of oscillations of the mirror 103 between the deflection angle of the ON light state and that of the OFF light state makes it possible to adjust the quantity of light reflected to the projection path.

In an exemplary embodiment, the deflection angle of the ON light state of the mirror is the plus 13 degrees and that of the OFF light state thereof is the minus 13 degrees. The mirror freely oscillates between the deflection angles of the ON light state and that of the OFF light state thus switches repeatedly between the ON light state and OFF light state. The control of the number of switches makes it possible to make a quantity of light of being less than that of the time of holding the mirror completely at the ON state incident to the projection path. For this reason, it is possible to generate an intermediate quantity of light between the ON light state and OFF light state. A control of the free oscillation of the mirror enables a reduced controllable quantity of light to generate an image display with a higher number of gray scales than that of an image generated by using a conventional ON-OFF control technique. Furthermore, there are additional flexibilities of adjustment of the range of deflection of the mirror freely oscillating from the present ±13° to different angular ranges such as ±8° and ±4°.

A mirror device that allows a free oscillation state further has the benefits of a longer life of operation and operated at a lower voltage than a conventional mirror device that operated only with two states, i.e., the ON light state and OFF light state. Furthermore, a higher number of gray scales are achievable to provide image with improved display quality.

Additional details related to the mirror element 101 are further described below. The mirror 103 includes a mirror surface composed of a high reflectance metal such as aluminum, silver and gold. The mirror 103 may have a multiple layer structure. The entirety or a part, e.g., a base part is attached to the device substrate 104. A neck part is attached to the mirror 103 with a middle part disposed between the base and neck parts of the elastic hinge 107. The hinge 107 is composed of an elastic material to provide a force of restitution. The elastic hinge 107 is made from aluminum, amorphous silicon, a single crystal silicon or such for example. The drive electrodes 108a and 108b are made from a conductor such as aluminum (Al), copper (Cu), tungsten (W), with a circuit connection configuration to allow for equal potentials on both of the drive electrodes 108a and 108b. In an exemplary embodiment, the mirror element includes an insulation layer 106 that is composed of silicone dioxide ($SiO_2$) or silicon carbonate (SiC) and the hinge are supported on a silicon substrate. It is understood that the material compositions and shapes for each part as described in the embodiments may be flexible changed to satisfy specific application requirements and manufacturing processes.

An incident light projected to the "mirror array" with a configuration wherein a plurality of mirror elements are supported on the device substrate 104 to reflect and modulate the incident light. Only the mirror elements being a part of the mirror array may be allowed to reflect and modulate the incident light. Those mirror elements that are configured not to reflect or modulate the incident light are referred to as a "non-modulation mirror element". The mirror device 100 as described above is contained and protected by a package from exposure to dust or physical damages such that a device malfunction is prevented. The package comprises a package substrate and a cover member. The mirror device is placed on the package substrate and covering the mirror device with the cover member joining with the package substrate particularly configured to support and to protect the mirror device. The package substrate is made of a metallic substrate, glass substrate or ceramic substrate.

In an exemplary embodiment, the cover member is made of glass. A part of the cover member includes a light-transmitting window to transmit an illumination light to project onto the mirror device.

Further details of an exemplary embodiment that includes an assembly body of a mirror package provided with an anti-reflection structure are described below.

Embodiment 1

Figure 4:
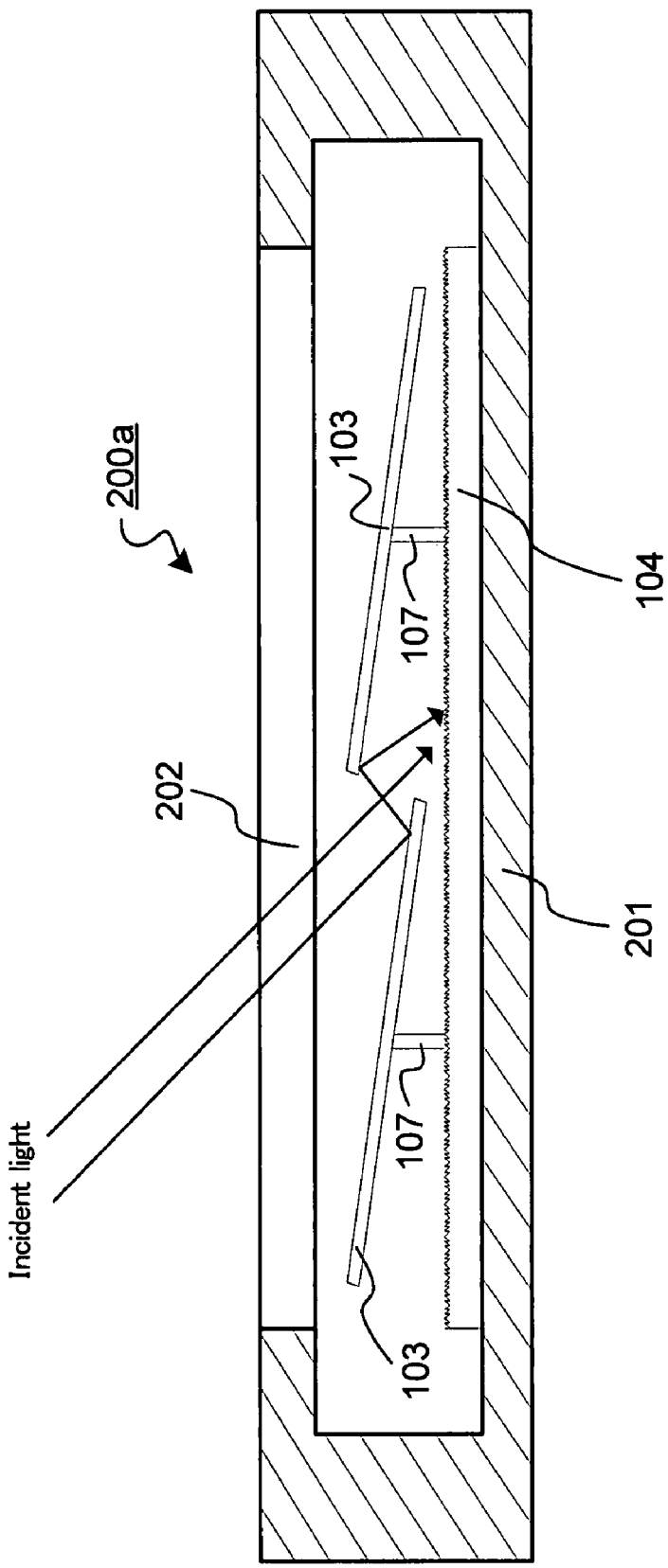
FIG. 4 is an illustrative front cross-section diagram of an assembly body accommodating a mirror device featuring with an anti-reflection structure by a package.

A mirror device includes an anti-reflection structure is disclosed as a preferred embodiment 1. FIG. 4 illustrates an exemplary mirror device that includes an anti-reflection structure formed on the device substrate. Specifically, FIG. 4 shows a front cross-section view of an assembly body 200a that function as a package for accommodating a mirror device. FIG. 4 shows only two mirror elements in the mirror device as an example. The assembly body 200a comprises a mirror device, a package substrate 201 and a cover member 202. The package actually includes other parts in additional to the mirror device. The package includes package substrate 201 and cover member 202 shown in FIG. 4 and these parts are part of the package.

Further details for the constituent component of the assembly body 200a are described below according what are shown in FIG. 4. It is understood that the term "inside of the package" noted in the present specification refers to a space sealing a mirror device. As an example, the space sealed by the package substrate 201 and cover member 202 of FIG. 4 is referred to as "inside of the package". Referring to FIG. 4, the device substrate 104 is placed on the package substrate 201, and the bottom surface of the device substrate 104 and package substrate 201 are joined together. And the mirror 103 supported by the elastic hinge 107 on the device substrate 104 has the role of reflecting and modulating the incident light emitted from the light source transmitted through the cover member 202. The top surface of the device substrate 104 is provided with an anti-reflection structure. This anti-reflection structure on the top surface of the device substrate 104 prevents the device substrate from reflecting the incident light passing between the mirror gaps. It is therefore possible to prevent an unnecessary reflection of the incident light from the device substrate 104 to reduce the reflection light from entering the projection path. As a result, the contrast of the displayed image is improved.

The package substrate 201 is joined to the cover member 202 for providing an approximate sealed space for protecting the mirror device from dust. The package substrate 201 may be composed of materials such as glass substrate, silicon substrate, ceramic substrate or metallic substrate. As the package substrate 210 supports and protect the device substrate 104 for the mirror device that includes plurality of mirror devices. Furthermore, the package substrate supports and protects a control circuit for controlling a mirror device and a part of a flexible printed circuit board for controlling a mirror device. Note that the package substrate 201 may be made from the same material as that of the device substrate 104.

The cover member 202 is designed so as to cover over the mirror device and the cover member 202 is joined to the package substrate 201. The cover member 202 has the major role of protecting the mirror 103 of the mirror device from external dust. The cover member 202 may flexibly use different glass materials or similar materials. As an example, silica glass and PYREX glass (registered trademark of Corning, Inc.) are available. It is preferable to provide the distance between the top surface of the mirror 103 and the bottom surface of the cover member 202, which has at least 100 times of a mirror size. Such a configuration makes it possible to widen an allowable range of coarseness of the surface of the cover member 202. As an example, the surface of the cover member 202 is produced with the coarseness in the range of about 0.05 to 0.15 μm/20 mm through 0.15 to 0.3/20 mm. The space in the inside of the package may be filled with gas or kept in an approximate vacuum. Joining between the package substrate 201 and cover member 202 or between the package substrate 201 and device substrate 104 may be joined together with a fritted glass or a joint layer composed of similar types of material compositions. The above descriptions are for the constituent components of the assembly body 200a according to the embodiment 1.

The next is a description of a design feature that an incident light entering the assembly body 200a is prevented from being reflected by the anti-reflection structure particularly provided on the device substrate 104 by referring to FIG. 4.

The incident light emitted from the light source enters the mirror device by way of the cover member 202. The incident light, which has entered the mirror device, is reflected on the mirror 103. In this event, a part of the incident light passes through the mirror gap between the individual mirrors 103 and enters the device substrate 104. Meanwhile, the incident light reflected on the mirror 103 may further be reflected from the bottom surface of the adjacent mirror 103 and other surround reflective surfaces, after entering the device substrate 104. These incident lights entering the device substrate 104 are prevented from being reflected by the anti-reflection structure now provided on the device substrate 104. As such, the featuring of the anti-reflection structure makes it possible to suppress an unnecessary reflection of the light arriving at the device substrate 104. This results in preventing an unnecessary reflection of light and the unnecessary reflection light from entering the projection path, thereby enabling an improvement of the contrast of the image.

Embodiment 2

The following descriptions are for a package featured with an anti-reflection structure as an embodiment 2. The embodiment 2 is a modified example of the embodiment 1. The package according to the embodiment 2 is configured to feature an anti-reflection structure on the internal and external wall surfaces of the package substrate of the embodiment 1. Other configuration of the embodiment 2 is similar to that of the embodiment 1 and therefore the description is omitted here.

Figure 5A:
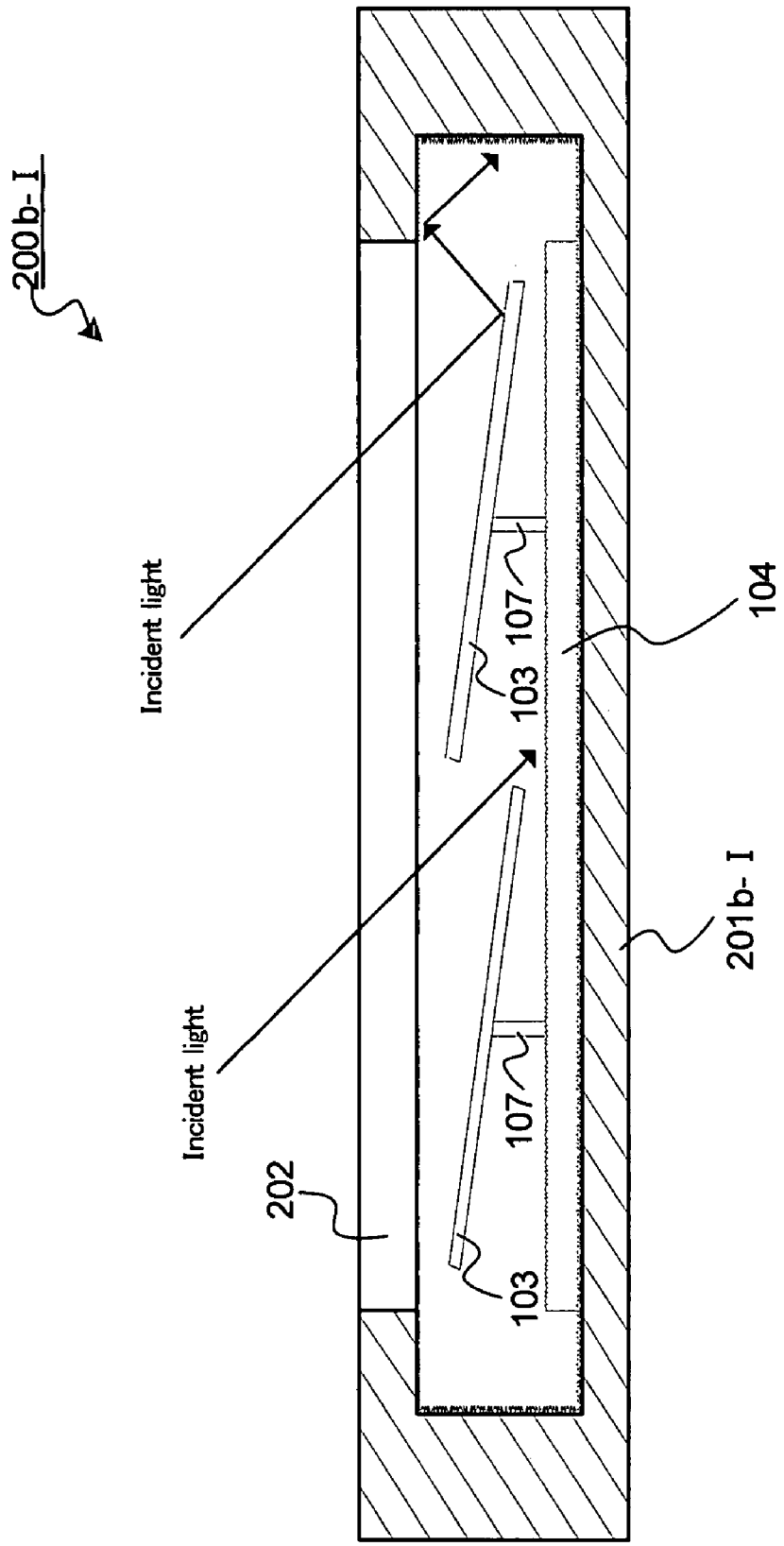
FIG. 5A is a front cross-section diagram of an assembly body featured with an anti-reflection structure on the inner wall of a package substrate of a preferred embodiment 1.

FIG. 5A is a front cross-section diagram of an assembly body 200b-I featured with an anti-reflection structure on the internal wall of the package substrate 201 of the embodiment 1. The assembly body 200b-I shown in FIG. 5A is featured with the anti-reflection structure described above on the inner wall on the package substrate 201b-I. A light reflected on the mirror 103 is prevented from being further reflected on the inner wall of the package substrate 201b-I by the anti-reflection structure featured on the inner wall of the package substrate 201b-I. As a result, the contrast of the image is improved.

Figure 5B:
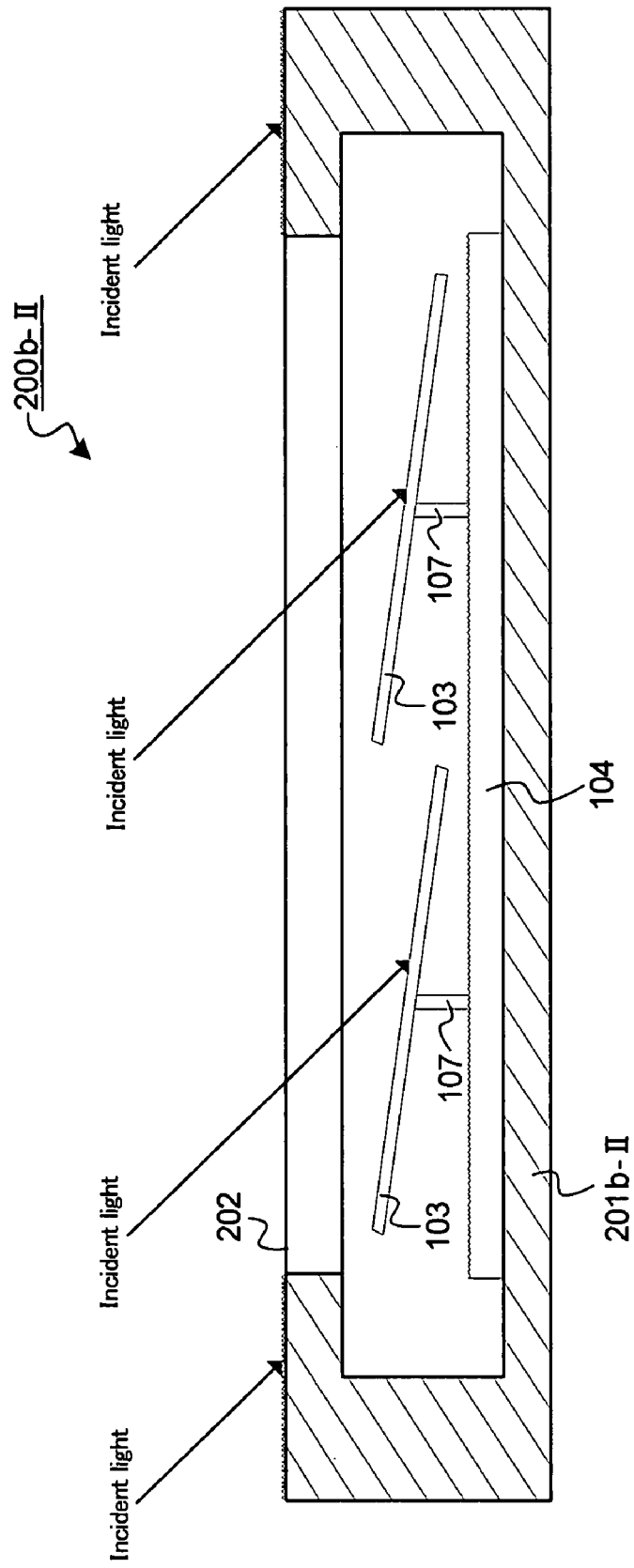
FIG. 5B is a front cross-section diagram of an assembly body featured with an anti-reflection structure on the outer wall of a package substrate of the embodiment 1.

FIG. 5B is a front cross-section diagram of an assembly body 200b-I featured with an anti-reflection structure on the outer wall of a package substrate 201 of the embodiment 1. The assembly body 200b-II shown in FIG. 5B is featured with an anti-reflection structure on the outer wall of the package substrate 201b-II. A reflection of an incident light at the time of entering the package substrate 201b-II is prevented by the anti-reflection structure featured on the outer wall of the package substrate 201b-II. This results in preventing the reflection light due to a reflection of the incident light on the outer wall of the package substrate 201b-II from entering the projection path and accordingly improving the contrast of the image.

Figure 6:
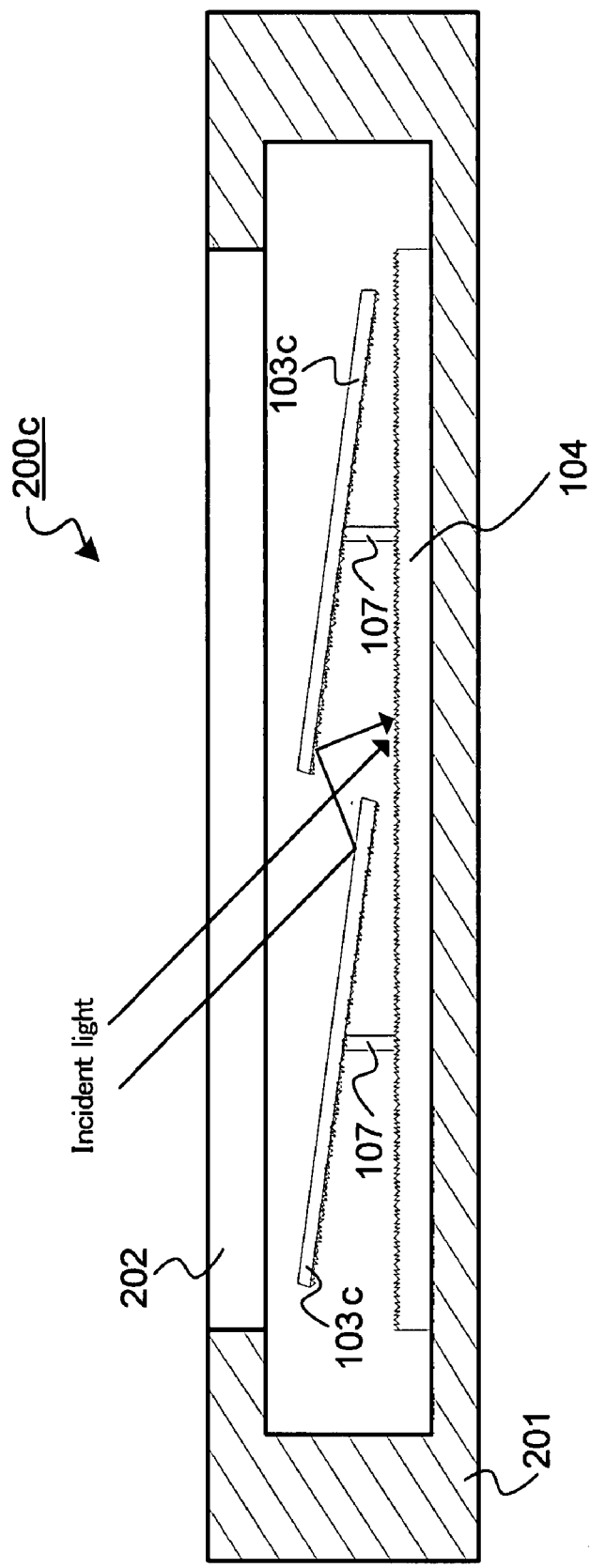
FIG. 6 is a front cross-section diagram of an assembly body featured with an anti-reflection structure on the bottom surface of a mirror of the embodiment 1.
Figure 7:
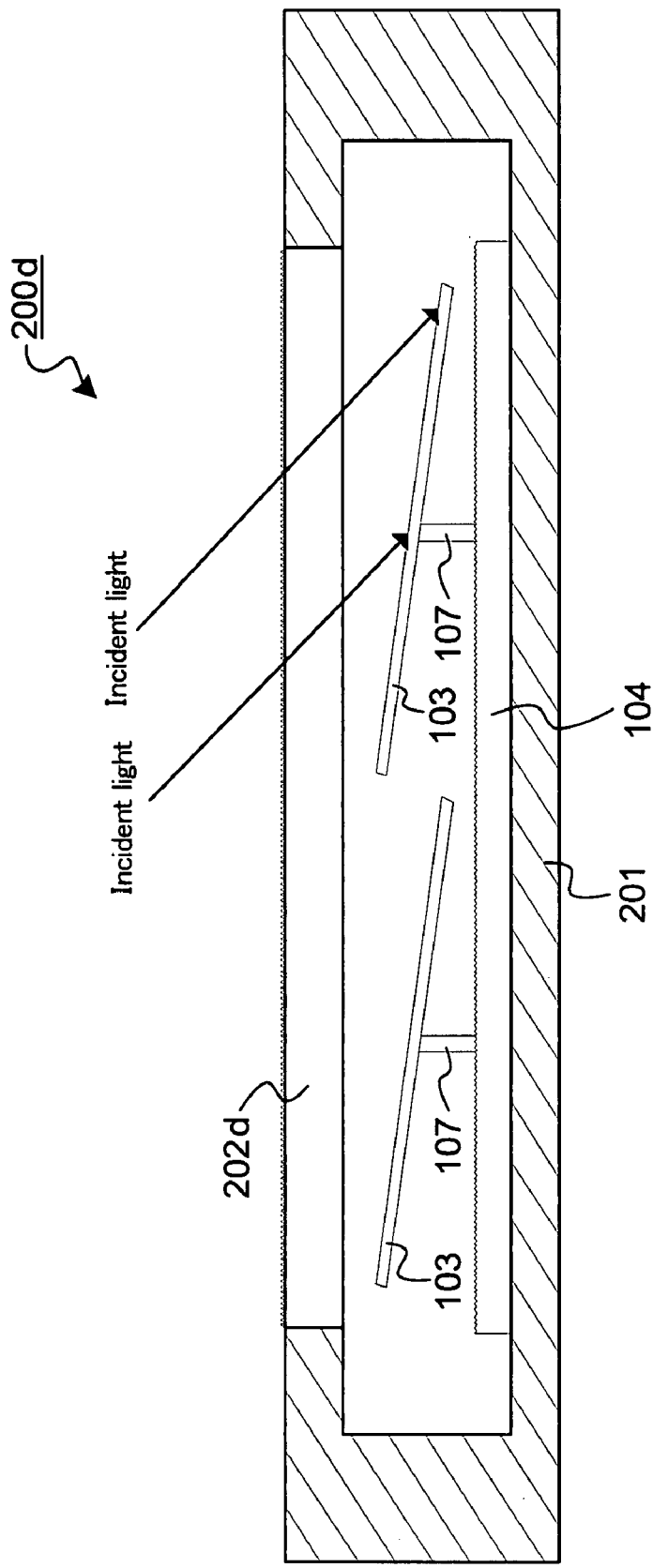
FIG. 7 is a front cross-section diagram of an assembly body featured with an anti-reflection structure on a cover member of the embodiment 1.
Figure 9A:
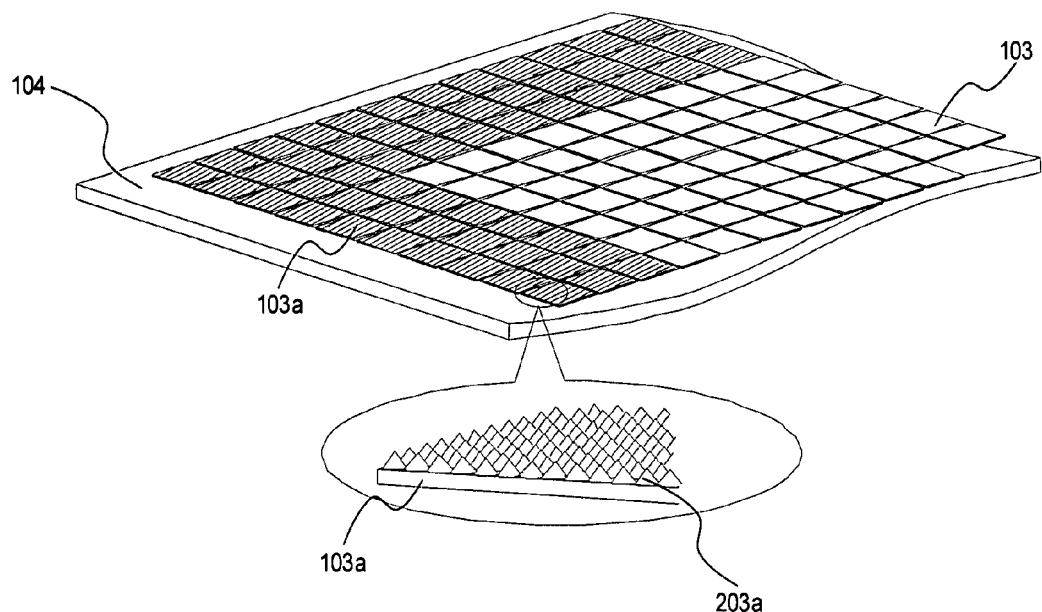
FIG. 9A is a plain view diagram of a mirror device featured with a two-dimensional anti-reflection structure for a non-modulation mirror element.

The design feature of placing the anti-reflection structure on both of the device substrate 104 and package substrate 201b-I, or on the device substrate 104 and package substrate 201b-II, as shown in FIGS. 5A and 5B, makes it possible to further prevent a reflection of the incident light. Meanwhile, as shown in FIGS. 6, 7 and 9A described below, the bottom surface of the mirror 103 of the mirror element and/or the cover member 202 may also be featured with an anti-reflection structure. Note that an anti-reflection structure may be featured on both of the inner and outer walls of the package substrate 201. Meanwhile, when a package substrate 201 featured with an anti-reflection structure and the substrate is made of a light transmission member such as glass, a special advantage is achieved because the light transmits the package substrate 201 while preventing a reflection of light at a part featured with the anti-reflection structure.

The anti-reflection structure of the present specification is of a cyclic structure of no more than the wavelength of an incident light as described later, and hence the structure has a tendency to be broken by an external force for instance. Therefore, it is preferable to configure the anti-reflection structure for an inner wall of a package than an outer wall because of the fact the outer wall is vulnerable to an external force.

Embodiment 3

The next is a description on a mirror featured with an anti-reflection structure, as an embodiment 3. The embodiment 3 is a modified example of the embodiment 1. The embodiment 3 is configured to feature an anti-reflection structure on the bottom surface of the mirror 103 of the embodiment 1. Other configurations of the embodiment 3 are similar to that of the embodiment 1 and therefore the description is omitted here.

FIG. 6 is a front cross-section diagram of an assembly body 200c featured with an anti-reflection structure on the bottom surface of the mirror 103 of the embodiment 1. The assembly body 200c shown in FIG. 6 is configured to feature an anti-reflection structure on the bottom surface of the mirror 103. Such a configuration makes it possible to prevent a light reflected on the edge of the mirror 103c from being further reflected on the bottom surface of the adjacent mirror 103c by the anti-reflection structure featured on the bottom surface of the adjacent mirror 103c. This results in preventing a reflection of the light on the bottom surface of each mirror 103c. A feature of forming an anti-reflection structure on both of the device substrate 104 and mirror 103c as shown in FIG. 6 makes it possible to prevent further an unnecessary reflection of the incident light. It is further possible to feature an anti-reflection structure on the package substrate 201 and/or cover member 202 as shown in FIGS. 5A and 5B described above and in FIG. 7 described below.

Embodiment 4

The next is a description on a package featured with an anti-reflection structure as an embodiment 4. The embodiment 4 is a modified example of the embodiment 1. The embodiment 4 is configured to feature an anti-reflection structure on the cover member 202 according to the embodiment 1. Other configurations of the embodiment 4 are similar to that of the embodiment 1 and therefore the description is omitted here.

FIG. 7 is a front cross-section diagram of an assembly body 200d featured with an anti-reflection structure on a cover member 202 of the embodiment 1. The assembly body 200d shown in FIG. 7 is configured to feature the anti-reflection structure as described above on the cover member 202d. Such a configuration prevents a reflection of an incident light on the cover member 202d by the anti-reflection structure and the incident light enters the inside of the package. Also enabled is to prevent the light reflected by the mirror device from reflecting on the cover member 202d, thereby preventing an unnecessary reflection light caused by the cover member 202d from entering the projection path. As a result, the contrast of the image is improved.

In the configuration shown in FIG. 7, the anti-reflection structure is formed on the top surface of the cover member 202d; an anti-reflection structure, however, may be provided only on the bottom surface of the cover member 202d. Furthermore, an anti-reflection structure may be formed on both of the top and bottom surfaces of the cover member 202d. The feature of forming the anti-reflection structure on both of the device substrate 104 and cover member 202d makes it possible to prevent further an unnecessary reflection of the incident light. It is also possible to feature an anti-reflection structure on the package substrate 201 of the package and/or the mirror 103 of the mirror element as shown in FIGS. 5A, 5B and 6 described above.

As exemplified in the above embodiments 1 through 4, the anti-reflection structure can appropriately be implemented on the entirety, or a part, of the mirror device and/or package.

Figure 8:
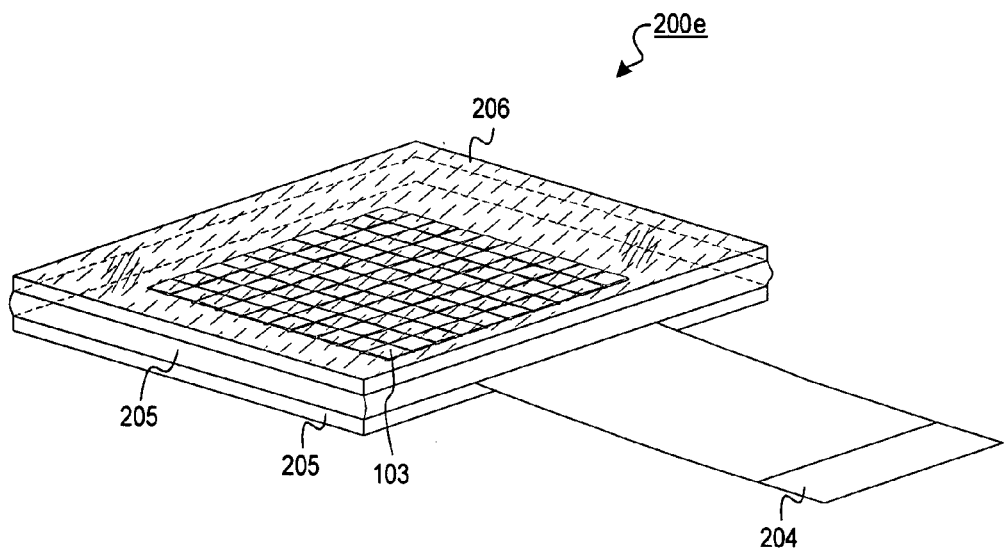
FIG. 8 shows an assembly body in which a transparent member such as glass constitutes a package accommodating a mirror device.

The next is a description of an effective example of featuring an anti-reflection structure on a package by referring to FIG. 8. FIG. 8 shows an assembly body 200e in which both of a package substrate 205 and cover member 206 of a package accommodating a mirror device are constituted by a transparent member such as glass. In the assembly body 200e, the mirror device is accommodated in a package constituted by a transparent package substrate 205 and a transparent cover member 206. Here, the transparent package substrate 205 and cover member 206 are made from glass, but limited to it. Note that the mirror device is shown as a mirror array arraying a plurality of mirrors 103. And the transparent package substrate 205 may be made of a flexible printed circuit board, with a flexible cable 204 of the flexible printed circuit board for controlling the mirror device extending from the inside to outside of the package.

When the package includes a transparent member, a part of the incident light is reflected on the transparent member and enters the projection path, resulting in degeneration of the contrast of the image. This is why the entire surface of the package of the assembly body 200e is featured with an anti-reflection structure (which is indicated by diagonal lines). This configuration makes it possible to prevent a reflection of the incident light on the transparent package substrate 205 and cover member 206. This results in preventing an unnecessary reflection light from entering the projection path, thereby enabling an improvement of the image. Note that, also in the case of using an LCD or LCOS as a spatial light modulator, a featuring of an anti-reflection structure on the wall of a device substrate retaining LC of LCD or LCOS; and/or a package of LCD or LCOS makes it possible to prevent an unnecessary reflection of light.

<Anti-Reflection Structure>

The description below provides details on an example of an anti-reflection structure by referring to FIGS. 9A, 9B, 9C and 9D. The anti-reflection structure is a structure having a short cyclic structure, which is shorter than the wavelength of a light, in one direction on a plane and one having a short cyclic structure, which is shorter than the wavelength of a light, in two directions on a plane. The anti-reflection structure is a structure having a cyclic triangular vertical cross-sectional structure shorter than the wavelength of a light for example.

The present specification implements an antireflective structure that has a cyclic triangular vertical cross-sectional structure, which is shorter than the wavelength of light, in one direction on a plane as "one-dimensional structure". Meanwhile, the antireflective structure may be implemented with a structure having a cyclic triangular vertical cross-sectional structure, which is shorter than the wavelength of light, in two directions on a plane as "two-dimensional structure". The one-dimensional structure is, as an example, an accordion-shape structure shown in FIG. 9C described later. The two-dimensional structure is, as an example, a structure of an approximate square cone or circular cone, that is, a cyclic triangular vertical cross-sectional structure of the two directions arranged in a matrix in a plane as shown in FIG. 9A described later.

The process of forming the anti-reflection structure may include a process of imprinting or to apply lithography methods in a MEMS process so that there is no need to deposit a light absorbing layer on a mirror as will hereinafter be described in detail. As a result, these structures have low reflectance for the wide wavelength bands and extend the angular acceptance ranges. Also, problems such as a material selection, an adhesion, a thermal endurance or a diffusion of the light associated with the conventional anti-reflection coating are eliminated.

The next is a description of an example of featuring an anti-reflection structure on a non-modulation mirror element by referring to FIG. 9A.

There is a particular mirror configuration of providing a larger number of mirrors than the number of pixels satisfying a desired resolution of an image in order to ease a position adjustment of a mirror device in relation to a projection optical system of an image display apparatus or for example to correct a trapezoidal distortion of the image. A non-modulation mirror(s) not contributing to displaying the image may exist depending on a setup of the image display apparatus. In such a case, the non-modulation mirror(s) is controlled in an always-OFF state or such so as to prevent the light reflected on the non-modulation mirror(s) from entering the projection path. Even with such a control, some level of light still enters the projection path and a degradation of the contrast of the image is occurred. Therefore, a mirror(s) equivalent to the non-modulation mirror is featured with the above anti-reflection structure for improving a contrast of the image.

FIG. 9A is a plain view diagram of a mirror device featured with a two-dimensional anti-reflection structure on a non-modulation mirror element. Note that the mirror element is shown by omitting components other than the mirror 103. And the non-modulation mirrors 103 are indicated by diagonal lines. The anti-reflection structure is featured on the non-modulation mirrors 103a in the exterior border region of the mirror array that are not used as light modulating mirror elements as shown in FIG. 9A. A featuring of a cyclic square cone two-dimensional structure which is shorter than the wavelength of an incident light, for example, on the non-modulation mirrors 103a in the configuration of FIG. 9A makes it possible to prevent a reflection of the light.

Figure 9C:
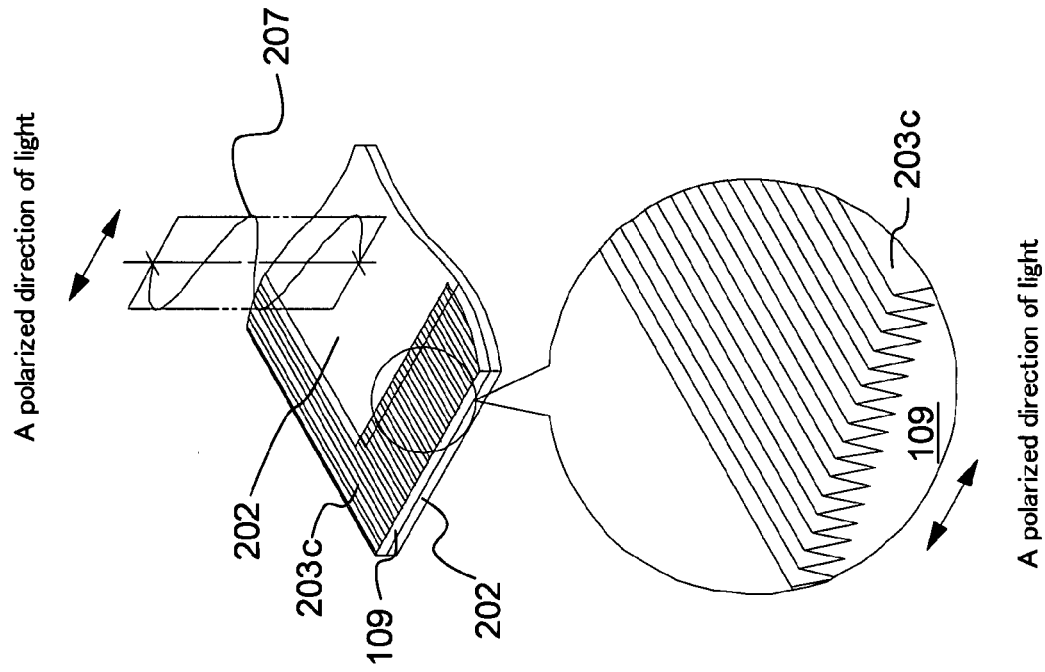
FIG. 9C shows a configuration laying a layer featured with a one-dimensional anti-reflection structure on a light reflection unnecessary unit, which has no purpose of reflecting light, of a cover member.
Figure 9B:
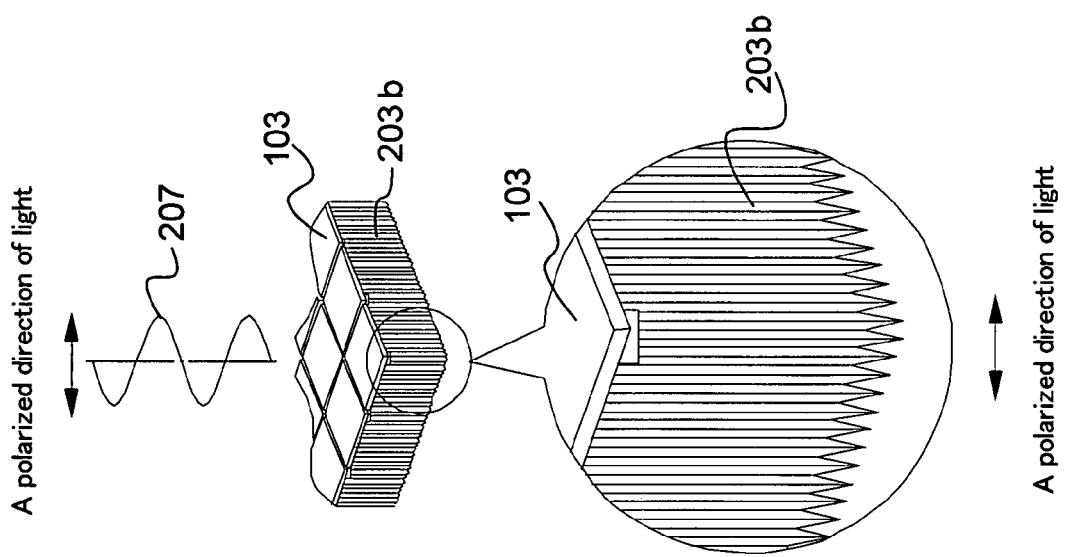
FIG. 9B shows a configuration featured with a columnar anti-reflection structure, of which the tip is two-dimensional structure, on the bottom surface of a mirror element.

The description below provides details of an anti-reflection structure in the case when a light emitted from the light source is a polarized light by referring to FIGS. 9B and 9C. According to APPLIED OPTICS, Vol. 32, Issue 14, pp 2582~, 1993, "Analysis of anti reflection structured surfaces with continuous one-dimensional surface profiles" written by Daniel H. Raguin and G. Michael Morris, the polarization direction of an incident light and a cyclic anti-reflection structure show different effects depending on the relative direction of them. Therefore, the invention disclosed in FIGS. 9B and 9C is to configure an incident light and a cyclic anti-reflection structure to have a specific relative direction, thereby making such a relative direction enables the most effective for improving the quality of image display. In a mirror device it is not required to emit a polarized light. However, in order to obtain a brighter image and a broad color gamut, a laser light source may be a preferable light source for emitting a polarized light.

The following description is to describe a preferred condition of a cyclic triangular vertical cross-sectional structure in one-dimensional and two-dimensional structure of an anti-reflection structure by referring to FIG. 9D. FIG. 9D shows the adjacent ridges of the antireflective structure configured with a cyclical triangular vertical cross-sectional structure. This structure is featured in one- and two-dimensional antireflective structures of an anti-reflection structure. FIG. 9D defines the distance between the apexes of adjacent ridges 203aa and 203ab as "pitch", the bottom side of one ridge 203aa as "width" and the height from the bottom to top of one ridge as "height". Taking these into consideration, a condition enabling an effective reduction of the reflection of light has been identified. The preferable anti-reflection structure of the spatial light modulator (SLM) and/or the package are such that each ridge of cyclic triangular vertical cross-sectional structure is shorter than the wavelength of incident light that satisfies a condition defined as:

$$\lambda > P > \lambda/2, \text{ and}$$

$$H/W > 3;$$

where the P is the pitch between adjacent ridges of the cyclic triangular vertical cross-sectional structure, the λ is a wavelength of the incident light, the H is the height of a ridge of the cyclic triangular vertical cross-sectional structure, and the W is the base width of a ridge of the cyclic triangular vertical cross-sectional structure. Also, the length of the ridge of the cyclic triangular vertical cross-sectional structure may be appropriately determined according to above optimal conditions.

The condition described above provides a good result in the wavelength band of visible light, which is 440 nm to 720 nm. For example, the cyclic triangular vertical cross-sectional structure is featured by an imprinting method used by a MEMS process described in a chapter for a producing process below. Also, the cyclic triangular vertical cross-sectional structure is featured by a lithographic method used by a MEMS process described in the chapter for a producing process below. The anti-reflection structure of each constituent component described in FIGS. 4 through 8 is, for instance, a one- or two-dimensional structure having the triangular vertical cross-sectional structure as described above. Note that the one-dimensional and two-dimensional structures may be intermixed in one constitute component, e.g., a device substrate.

<Method for Featuring an Anti-reflection Structure on a Spatial Light Modulator and on a Package>

The following description describes a method for featuring an anti-reflection structure on a spatial light modulator and on a package. The present embodiment is described on the method for featuring an anti-reflection structure on a mirror device by taking an example of a spatial light modulator. The processes of producing a mirror device with an anti reflection structure according to this embodiment is summarized below.

Figure 10B:
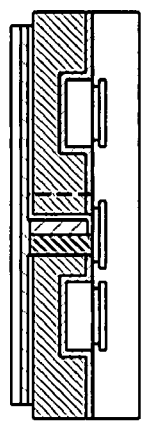
FIG. 10B shows an example of the producing process of a mirror device having an anti-reflection structure.
Figure 10B:
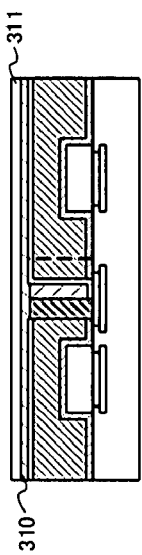
Figure 10B:
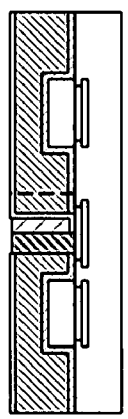
Figure 10B:
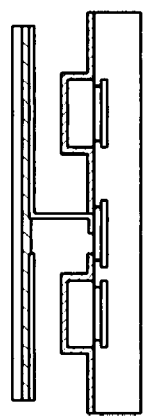

FIGS. 10A and 10B show an example of the production process of a mirror device featuring an anti reflection structure according to the present embodiment. In FIG. 10A, beginning from step 1, a drive circuit 303 and a wiring pattern 302 for driving and controlling the mirrors are formed in a semiconductor wafer substrate 301. In the step 2, the electrodes 304 connected to the drive circuit 303 are formed on the wiring pattern 302. Then, the drive circuit 303 formed in the semiconductor wafer substrate 301 is tested to check for abnormality of the operation of the drive circuit 303 and continuity of the electrodes 304. If no abnormality is detected in the drive circuit 303 and the electrodes 304 in this step, the process proceeds to the next step. In the step 3, an insulation layer 305 is formed on the electrodes 304. The insulation layer 305 not only prevents an electrical short circuit during the mirror operation but also prevents the electrodes from being eroded through etching in a subsequent step. Examples of the material of the insulation layer 305 are SiC, Si3N4 and Si. Here, a constituent member, which is featured with the anti-reflection structure described above having a shorter cycle than the wavelength of the incident light, e.g., a visible light, is pressed on the insulation layer 305, thereby transfer-printing (noted as "transferred" hereinafter) the cyclic structure of the anti-reflection structure to the insulation layer 305. Alternatively, the cyclic structure may be transferred to a layer, which is a layer other than the insulation layer 305, e.g., a polyimide layer that is an anti-reflection layer, provided additionally. The present specification calls such a method as an imprinting method.

Furthermore, the cyclic anti-reflection structure may be formed by using an etching process that applies a lithographic technique, or other similar manufacturing processes. In such a case, the anti-reflection structure may be formed by combining an anisotropic etching with an isotropic etching, carrying out multiple times of etchings, or repeating either the anisotropic etching or isotropic etching processes. These methods enable the formation of an anti-reflection structure on the device substrate of the mirror device.

In the step 4, a first sacrificial layer 306 is deposited on the semiconductor wafer substrate 301 to form the drive circuit 303 and electrodes 304 thereon. The first sacrificial layer 306 is used for forming mirror surfaces in a subsequent step, with a space provided between each of the mirror surfaces and semiconductor wafer substrate 301. An example of the material of the first sacrificial layer 306 is SiO2. In this embodiment, thickness of the first sacrificial layer 306 determines the height of an elastic hinge for supporting the mirror.

After the above process, a cyclic structure on the first sacrificial layer 306 is formed by using the aforementioned imprinting method to print the cyclic structure of the anti-reflection structure on the surface of a structure body that will be deposited on a later process The bottom surface of a mirror or that of a structure body is equivalent to the aforementioned component. The process forms the cyclic anti-reflection structure on the first sacrificial layer 306 by an etching process. In the step 5, etching is used for removing a part of the first sacrificial layer 306. The etching process is carried out in accordance with a predetermined height and shape of the expected elastic member as will be formed in a subsequent step. In the step 6, the elastic member 307 including a connection section connected to the semiconductor wafer substrate 301 is deposited on the semiconductor wafer substrate 301 and the first sacrificial layer 306 is formed in the step 4. In the present embodiment, the elastic member 307 will form the elastic hinge that supports the mirror later. Examples of the materials of the elastic member 307 include silicon material such as single crystal silicon, poly-silicon, and amorphous silicon; and/or metals such as aluminum and titanium and alloys of these metals. By adjusting the amount of deposition of the elastic member 307 in this step, the final thickness of the elastic hinge is determined.

In the step 7, a photoresist 308 is deposited on the structure formed on the semiconductor wafer substrate 301 in the previous steps. In the step 8, a mask that transfers a desired structure shape is used to expose the photoresist 308 and the elastic member 307 deposited on the semiconductor wafer substrate 301 is then etched to form the desired structure shape. The etching in this step divides the elastic member 307 deposited on the semiconductor wafer substrate 301 in the step 6 into individual elastic hinges corresponding to individual mirrors of mirror elements in the mirror device. In the step 9, a second sacrificial layer 309 is further deposited on the structure deposited on the semiconductor wafer substrate 301 in the step 8 and the preceding steps thereof. The composition of the second sacrificial layer 309 may be the same as that of the first sacrificial layer 306. For example, SiO2 is used. In this step, the second sacrificial layer 309 is deposited to be higher than at least the upper surface of the elastic member 307.

In the step 10 shown in FIG. 10B, the photoresist 308 and second sacrificial layer 309 deposited on the semiconductor wafer substrate 301 in the step 9 and the preceding steps thereof are polished until the upper surface of the elastic member 307, which is the elastic hinge, is exposed. In the step 11, a mirror layer 311 is deposited in such a way that it is connected to the upper surfaces of the photoresist 308 and elastic member 307 that have been exposed in the step 10. Examples of the material of the mirror layer 311 in this step include aluminum, gold and silver. Furthermore, in this step, in order to support the mirror layer 311 and strengthen the connection to the elastic hinge, or in order to prevent in most cases a stopper from adhering to the mirror when the mirror is deflected, a mirror support layer 310 made of a material different from that of the mirror may be formed between the mirror layer 311 and elastic member 307. Examples of the materials of the mirror support layer 310 include titanium and tungsten. In the step 12, a photoresist (not shown in a drawing) is coated on the mirror layer 311 deposited in the step 11. After a mask is used to expose the photoresist for forming a mirror pattern, the subsequent etching provides individually divided mirrors and shapes the mirrors. In this step (step 12), since the first sacrificial layer 306, photoresist 308 and second sacrificial layer 309 are still present under the mirror; no direct external force is applied to the elastic member 307. At the point when such a structure is formed, it is possible to divide the semiconductor wafer substrate 301 into individual mirror devices. However, a protective layer is desirably further formed on the mirror layer 311 preferably in the viewpoint of preventing a reduction in reflectance, for example, due to an attached foreign matter and a scratch on the mirror layer 311. By further depositing the protective layer on the mirror layer 311, it is possible to prevent contamination of the elastic member 307 with foreign matter, destruction of the elastic member 307, attachment of foreign matter to the mirror and generation of scratches when dicing is used for dividing a plurality of mirror layer 311 formed on the semiconductor wafer substrate 301 into individual mirror devices.

Then, the plural mirror layers 311 formed on the semiconductor wafer substrate 301 are divided into individual mirror devices. The dicing step for dividing the semiconductor wafer substrate 301 into individual mirror devices includes the substeps of attaching a UV tape that loses adhesion upon illumination of UV light to the backside of the semiconductor wafer substrate 301, mounting the entire semiconductor wafer substrate 301 having the UV tape attached to the backside thereof to a frame of the dicing system, and using a circular blade that is called a diamond saw to cut the semiconductor wafer substrate 301. After the semiconductor wafer substrate 301 is divided into individual mirror devices, the UV tape is stretched to pull the cut mirror devices so as to create gaps between them. Therefore, the individual mirror devices are completely separated from each other. Then, when a UV light is illuminated to the backside of the UV tape attached to the backsides of the completely-separated individual mirror devices, the adhesion is lost and hence the mirror devices are easily separated from the UV tape. The dicing step is not limited to the diamond saw cutting described above, but may be performed by other methods, for example, a laser cutting, a high pressure water stream cutting, etching scribe lines using another etchant, and reducing the thickness of the semiconductor wafer substrate 301 after scribe lines are formed.

After the step 12 is completed, in the subsequent step 13, the first sacrifice layer 306, photoresist 308, second sacrifice layer 309 and protective layer are removed by using an appropriate etchant, so that the mirrors protected by these layers become deflectable. In this way, the elastic members 307 and the mirror layers 311 can be formed on the semiconductor wafer substrate 301 and deflected by using the drive circuit 303 and electrodes 304. Finally, a completed mirror device is accommodated in a package.

The anti-reflection structure of the mirror device can also be achieved by applying a sol-gel method for instance, in addition to the imprint method of transfer by the imprinting and the production method of a chemical etching, e.g., the lithography. In the sol-gel method, for instance, a coating of a solution of a mixture between an extremely fine particle of a nanometer level and a sol or gel material on a target body, followed by drying the target body, makes it possible to feature a fine structure on the target body. The use of the sol-gel method enables the forming of a fine structure on a plurality of members at once, and therefore a large number of processes such as a conventional method for forming a plurality of anti-reflection layers are no longer required, resulting in improving productivity.

The method for providing an anti-reflection structure as described above is applicable to a package and other optical elements, e.g., a prism. Note that, also in the case of using an LCD or LCOS as a spatial light modulator, the use of the method described above enables a featuring of an anti-reflection structure on the wall of a device substrate retaining LC (liquid crystal) of LCD or LCOS; or a package.

<Image Display Apparatus Comprising a Spatial Light Modulator, a Package, and/or an Optical Element Featured with an Anti-reflection Structure,>

The following description is related to an image display apparatus comprising a spatial light modulator, a package, and/or an optical element featured with an anti-reflection structure, which is described above. The following drawing refers to a reflective spatial light modulator featured with an anti-reflection structure, e.g., a mirror device and a Liquid Crystal On Silicon (LCOS). Note that a use of a transmissive spatial light modulator, e.g., a Liquid Crystal Device (LCD), and an appropriate change of configuration of an image display apparatus as described below make it possible to display an image, which can easily be understood by a person skilled in the art.

<Single-plate Image Display Apparatus>

Figure 11:
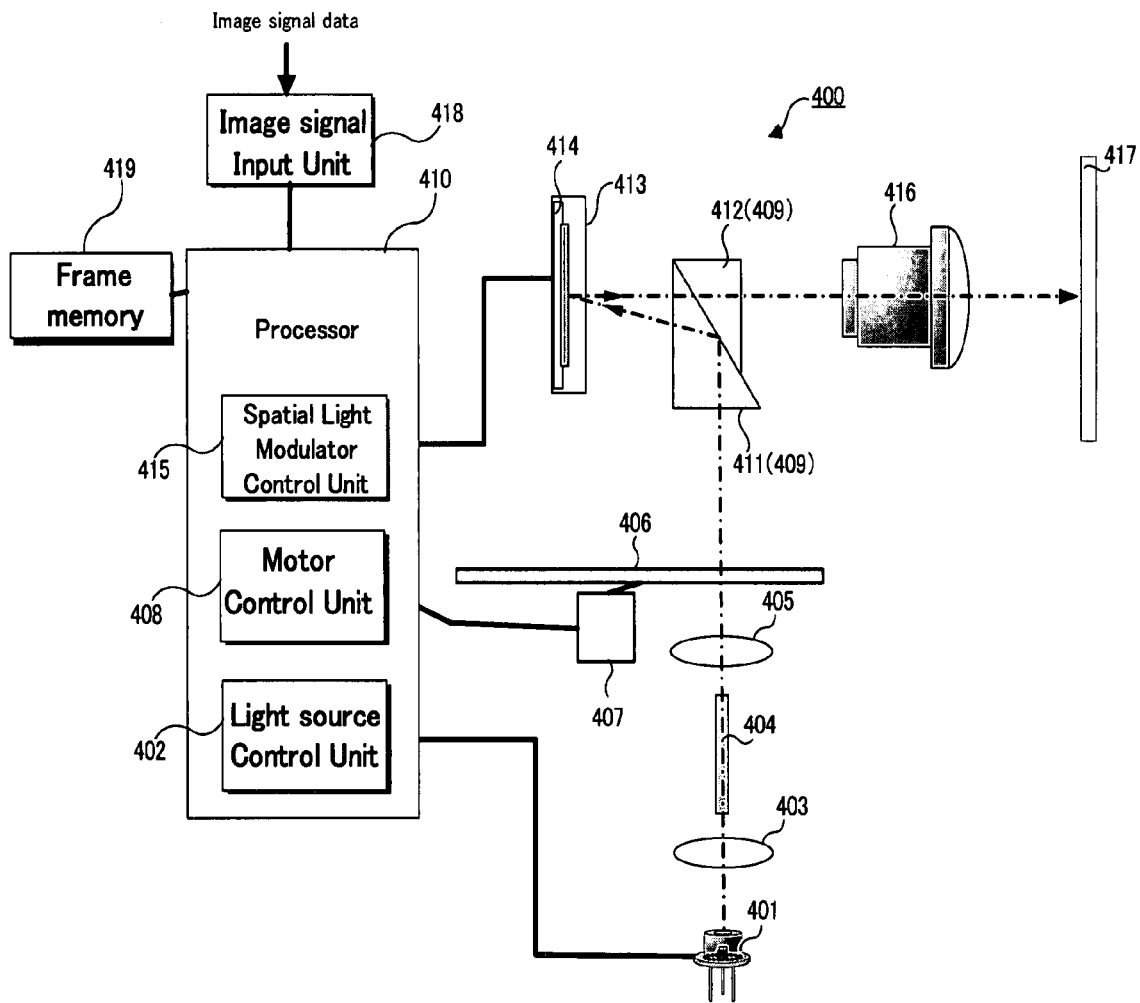
FIG. 11 is a configuration diagram of a single-plate image display apparatus comprising a single spatial light modulator featured with an anti-reflection structure.

To begin with, the following description is for an example of a single-plate image display apparatus comprising a single spatial light modulator featured with an anti-reflection structure. FIG. 11 is a configuration diagram of a single-plate image display apparatus 400 comprising a single spatial light modulator featured with an anti-reflection structure. The single-plate image display apparatus 400 comprises the following constituent members. A light source 401 emits a light for projecting an image. A light source control unit 402 at a processor 410 controls the light source 401. The light source 401 may be an arc lamp or the like, or may be a laser light source or a light emitting diode (LED). Or the light source 401 may be constituted by a plurality of sub-light sources. The light source control unit 402 adjusts the number of the sub-light sources to turn on for controlling a quantity of light. The light source control unit 402 biases the position of a sub-light source to turn on for controlling a locality of an intensity of light. For the light source 401 that includes a plurality of laser light sources with different wavelengths, a changeover of each laser light source by means of the light source control unit 402 makes it possible to select a color of an incident light. Therefore, a color wheel 406 described later is not required. Also possible is a pulse emission of light of a laser light source or light emitting diode source.

When using a near-parallel flux of light with a small light dispersion angle such as a laser light source, the numerical aperture NA of an illumination light flux reflected on the mirror device that is a spatial light modulator can be reduced based on the relation of etendue. By this, while avoiding an interference of the illumination light flux prior to being reflected on the mirror device with the projection light flux after being reflected thereon, these fluxes can be moved close to each other. As a result, the mirror can be downsized and also the mirror can be implemented with a smaller deflection angle. With a smaller mirror deflection angle it is feasible to more the illumination light flux and projection light flux closer to each other to shorten the difference of light path lengths between the incident light and reflection light passing through the package and make the difference of transmission of the package smaller. Larger amount of incident light or reflection light enter the mirror array or projection path. Therefore, making the deflection angle of the mirror small by using a laser light source enables a provision of brighter image. A condenser lens-1 403 focuses the light from the light source. A rod integrator 404 uniforms an intensity of light. A condenser lens-2 405 focuses the light output from the rod integrator 404. A color wheel 406 includes a filter member comprising a plurality of filters. Each of the individual filters extracts a specific wavelength. As an example, the filter member may include three filters, e.g., a filter for extracting the light of the wavelength of red, one for extracting the light of the wavelength of green and one for extracting the light of the wavelength of blue. And, each filter of a light-passing path can be changed over by rotating or sliding the filter member constituted by the filters by a color wheel drive unit 407. The filter may have a deflection characteristic. A motor control unit of the processor 410 controls the color wheel drive unit 407. The color wheel drive unit 407 controls the rotation or slide speed of the filter. A total internal reflection (TIR) prism 409 includes two triangle prisms, i.e., a first prism 411 and a second prism 412. The first prism 411 has the role of totally reflecting the incident light. As an example, the first prism 411 totally reflects the incident light to the light path entering the reflective spatial light modulator. The totally reflected light is modulated by the reflective spatial light modulator and reflected to the second prism 412. The second prism 412 transmits the reflection light incident thereto below a critical angle. The respective surfaces of the first prism 411 and second prism 412 may further comprise an anti-reflection structure.

FIG. 11 shows a package containing a spatial light modulator 414. The spatial light modulator 414 shown in FIG. 11 is a mirror device or LCOS that is a reflective spatial light modulator featured with the anti-reflection structure as described above. An anti-reflection structure may also be formed on the package 413 as described above. An SLM control unit 415 of the processor 410 controls the spatial light modulator 414. A projection lens 416 has the function of enlarging the light reflected and modulated by the spatial light modulator 414 so as to project the light on a screen 417. The processor 410, comprising a light source control unit 402, a motor control unit 408 and a spatial light modulator control unit 415, is capable of synchronously controlling each of the aforementioned control units by combining them. The processor 410 is connected to an image signal input unit 418 to receive and process image signal data. The processor 410 is further connected to the frame memory 419 for sending the processed image signal data. The image signal input unit 418 inputs the incoming image signal data to the processor 410. The frame memory 419 is capable of storing the image signal data of a single image processed by the processor 410. These are the constituent members comprised by the single-plate image display apparatus 400 shown in FIG. 11.

The following description describes the principle of displaying a color image at the single-plate image display apparatus 400 shown in FIG. 11. In the single-plate image display apparatus 400, the light emitted from the light source 401 enters a filter of the color wheel 406 by way of the condenser lens-1 403, rod integrator 404 and condenser lens 405. The light extracted only the light of a specific wavelength by a filter of the color wheel 406 enters the first prism 411 of the TIR prism 409. And the light reflected by the first prism 411 of the TIR prism 409 enters the spatial light modulator 414 accommodated in the package 413. In this event, a reflection of the incident light by the cover member of the package 413 and by the device substrate of the spatial light modulator 414 can be reduced because both the package 413 and spatial light modulator 414 are featured with the anti-reflection structure as described above.

The light reflected and modulated by the mirror element of the spatial light modulator 414 re-enters the TIR prism 409 and transmits the second prism 412 thereof. Then the transmitted light is projected on the screen 417 by way of the projection lens 416. When displaying an image as such, the light source control unit 402 in the processor 410 controls the quantity of light or such, emitted from the light source based on the image signal data incoming by way of the image signal input unit 418. The motor control unit 408 is controlled based on the image signal data, and the motor control unit 408 controls the color wheel drive unit 407. And, the control for changing over filters of the color wheel 406 is performed by the color wheel drive unit 407. Furthermore, the SLM control unit 415 controls the plurality of light modulation elements of the spatial light modulator 414 based on the image signal data. The single-plate image display apparatus 400 configured as described above divides a period for displaying one image (i.e., one frame) into sub-frames corresponding to the individual wavelengths of light in relation to the respective wavelengths of light, e.g., a wavelength corresponding to red, one corresponding to green and one corresponding to blue. And the light of each wavelength is illuminated to the spatial light modulator 414 in accordance with a period of each sub-frame. According to such image display time sequence, the period of each sub-frame, the period of modulating the light of each wavelength at the spatial light modulator 414 and the period of stopping a filter of the color wheel 406 are mutually dependent. A selective reflection of the incident light at the spatial light modulator 414 enables only the light of the individual wavelength reflected to the projection path to be projected to the screen. And a sequential projection of lights of the individual wavelengths in accordance with the respective sub-frame periods enables a display of a color image.

The following description describes an example of a multi-plate image display apparatus comprising a plurality of spatial light modulators featured with an anti-reflection structure. The multi-plate image display apparatus comprises a plurality of light sources, a plurality of spatial light modulators and a projection lens. The light source may preferably be a laser light source or a light emitting diode (LED). A plurality of laser light sources may be equipped, with each light source being independently controlled. The independent control of each light source can eliminate a color filter by turning off a laser light source having a prescribed wavelength. The use of a laser light source enables a pulse emission that has been difficult to achieve with a mercury lamp. Note that a plurality of spatial light modulators are respectively referred to as reflective spatial light modulators likewise the single-plate spatial light modulator described above.

The following description describes the configuration and principle to display an image of a two-plate image display apparatus and three-plate image display apparatus as an example of multi-plate image display apparatus comprising a package and a plurality of spatial light modulators featured with an anti-reflection structure.

<Two-plate Image Display Apparatus>

The two-plate image display apparatus is configured to make two spatial light modulators corresponding respectively to two groups of light sources. And one spatial light modulator modulates the light emitted from one group of light sources and another spatial light modulator modulates the light emitted from another group of light sources. Then, the reflected and modulated light by each of the spatial light modulators is synthesized, thereby displaying an image. As an example, when displaying an image with the lights of wavelengths corresponding to three colors, i.e., red light, green light and blue light, green light having the high luminosity factor is modulated by one spatial light modulator, and red and blue lights are modulated by another spatial light modulator in sequence or simultaneously, followed by synthesizing the light modulated by each spatial light modulator and displaying an image.

FIGS. 12A through 12D are configuration diagrams of a two-plate image display apparatus comprising two of a spatial light modulator featured with an anti-reflection structure accommodated in one package. The image display apparatus 500 shown in FIGS. 12A through 12D comprises a green laser light source 501, red laser light source 502, blue laser light source 503, illumination optical systems 504a and 504b, two triangle prisms 506 and 508, two spatial light modulators 520 and 530 which are accommodated in one package 511, a circuit board 508, a joint member 512, a light shield member 513, a light guide prism 514 and a projection optical system 523.

The following description describes the constituent components of the image display apparatus 500 shown in FIGS. 12A through 12D. The individual light sources 501, 502 and 503 are laser light sources as described for the single-plate image display apparatus and capable of performing a pulse emission. They may be comprised of a plurality of sub-laser light sources alternatively. The light source may use two mercury lamps corresponding to the respective spatial light modulators. In the case of using the mercury lamps, an equipment of a filter 505 allowing a passage of only a light of a specific wavelength while reflecting other light of wavelengths on the surface of synthesizing the reflection light in a prism 510 described later provides a similar effect as a color filter. Alternatively, using a dichroic prism or dichroic mirror, thereby illuminating the spatial light modulator with the light of the separated wavelength, may separate a wavelength of light. The illumination optical systems 504a and 504b are optical elements such as collector lenses described for the single-plate image display apparatus, rod integrators, convex lenses or concave lenses.

The prism 510 by combining two triangle prisms 506 and 509 has the role of synthesizing the reflection lights from the two spatial light modulators 520 and 530. When the prism 510 synthesizes the reflection lights from the individual spatial light modulators, it may be appropriate to equip the filter 505, e.g. a dichroic filter, allowing a passage of only a light of a specific wavelength while reflecting other light of wavelengths on the surface of synthesizing the reflection light in a prism 510. Note that an anti-reflection structure can be featured on the surface of the prism 510. The filter 505 has the same role as a color filter because of a capability of allowing a passage of only a light of a specific wavelength while reflecting other light of wavelengths. Meanwhile, when using a laser light source emitting a light having a specific deflection direction, a deflection light beam splitter film separating/synthesizing light by using a difference of deflection direction of light on the surface of synthesizing a reflection light in the prism 510 may be used, or a deflection light beam splitter coating may be applied to the aforementioned surface.

The package 511 is similar to the package provided with the anti-reflection structure described for the single-plate image display apparatus. The package 511 noted in FIGS. 12A through 12D is configured to be capable of accommodating two spatial light modulators 520 and 530 within one package 511. The spatial light modulators 520 and 530 may be accommodated in separate packages, however. The spatial light modulators 520 and 530 are similar to the spatial light modulator featured with the anti-reflection structure described for the single-plate image display apparatus. Note that FIGS. 12A through 12D show the mirror arrays 521 and 531, and device substrates 533 and 532, of the respective spatial light modulators 520 and 530. The circuit board 508 is connected to a processor, which is similar to the processor implemented for the single-plate image display apparatus described above. The processor comprises a spatial light modulator control unit and a light source control unit. And the processor processes the input image signal data and reports the processed information to the spatial light modulator control unit and light source control unit. The spatial light modulator control unit and light source control unit control the spatial light modulator and light source respectively by way of the circuit board 508 based on the processed information. The control of the spatial light modulator can be synchronized with that of the light source. The input of the image signal data to the processor and other activity have been described for the single-plate image display apparatus and therefore omitted here.

The joint member 512 has the role of joining the prism 510 to the package 511. A material used for the joint member 512 includes a fritted glass for example. The light shield member 513 has the role of shielding unnecessary light. A material used for the light shield member 513 includes graphite for example. The image display apparatus 500 shown in FIGS. 12A through 12D is equipped with the light shield member 513 not only on a part of the bottom of the prism 510 but also on the back of the prism 510. The light guide prism 514 is a prism by adhesively attaching the slope face on the front face of the prism 510 with the bottom of the light guide prism 514 facing upward. And the light guide prism 514 is equipped so that the individual light sources 501, 502 and 503, the illumination optical systems 504a and 504b corresponding to the respective light sources and the light axis of the light emitted from the individual light sources 501, 502 and 503 are respectively perpendicular to the bottom of the light guide prism 514. This configuration enables the lights emitted from the individual light sources 501, 502 and 503 to be perpendicular to incident to the light guide prism 514 and prism 510. This results in enabling a minimum of the reflection of lights occurred by the light guide prism 514 and prism 510 when the lights emitted from the individual light sources 501, 502 and 503 enters the light guide prism 514 and prism 510. Note that an anti-reflection structure can be provided on the surface of the light guide prism 514.

The projection optical system 523 is an optical element for displaying an appropriate image to the screen. As an example, the projection system may include a projection lens for enlarging the light for displaying an image to the screen. Note that, when using both of a light source emitting a polarized light and a polarization beam splitter film, a two-plate image display apparatus can be configured by using a ½ wavelength plate or ¼ wavelength plate on the surface of the prism 501. FIGS. 12A to 12D show the two plate image display apparatus 500 with the constituent members.

The following description describes the principle to display an image of the two-plate image display apparatus 500 by referring to FIGS. 12A through 12D. In the image display apparatus 500, the green laser light 515, red laser light 516 and blue laser light 517 are entered to the front direction of the prism 510. The individual laser lights 515, 516 and 517 are reflected back to the prism 510 by two spatial light modulators 520 and 530 provide with the anti-reflection structure as described above. Then, the respective laser lights 515, 516 and 517 reflected on the backside of the prism 510 are synthesized and the combined image is projected to the screen by the projection optical system 523.

Figure 12A:
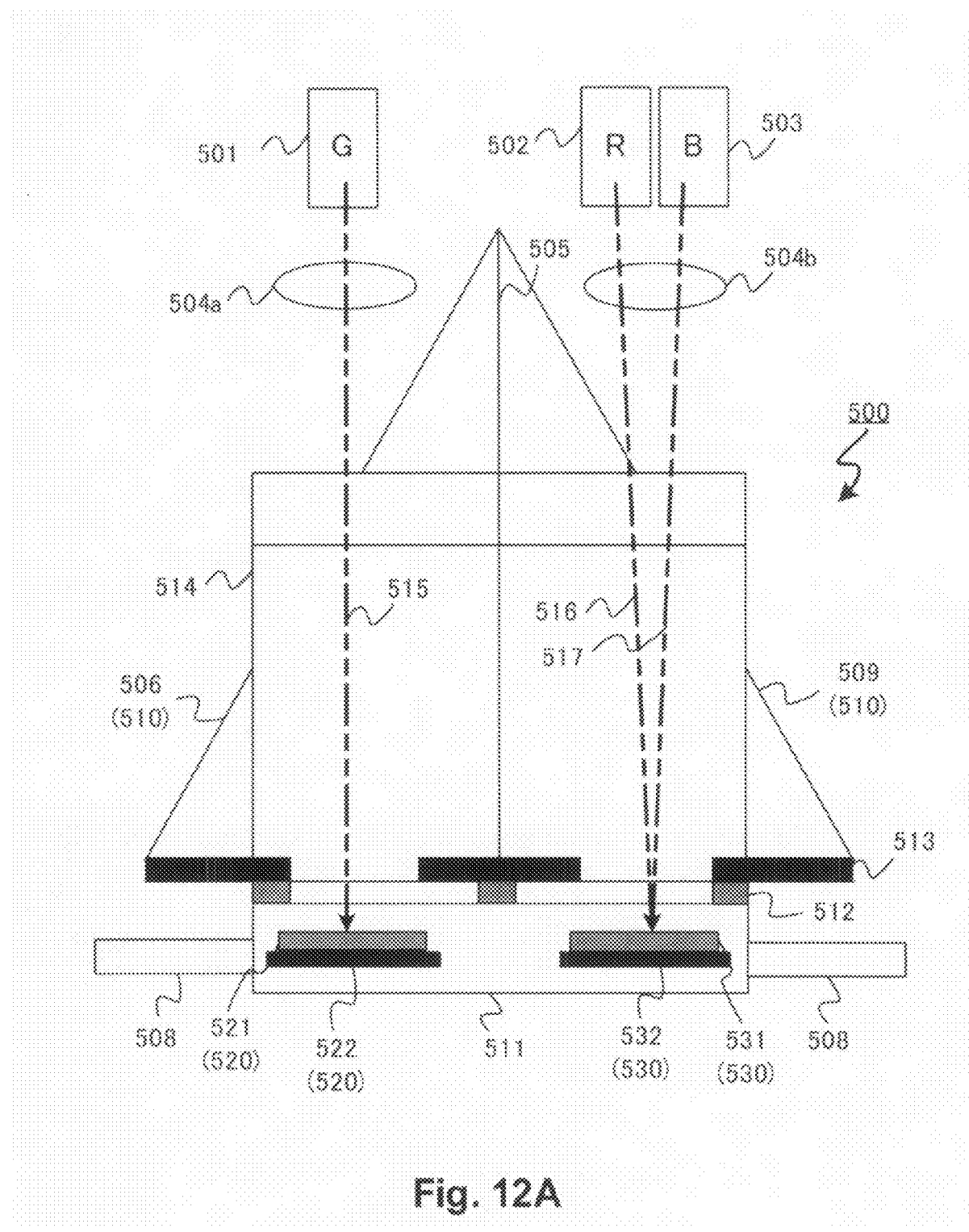
FIG. 12A is a front view diagram of a configuration of a two-plate image display apparatus comprising two of a spatial light modulator featured with an anti-reflection structure.

FIG. 12A is a front view diagram of a two-plate image display apparatus comprising two spatial light modulators featured with an anti-reflection structure.

The following description describes the principle of the image display between the incidence of the individual laser lights 515, 516 and 517 from the front direction of the prism 510 and the reflection of the respective laser lights 515, 516 and 517 back to the prism 510 by two spatial light modulators 520 and 530. The green laser light source 501, red laser light source 502 and blue laser light source 503 project individual laser lights 515, 516 and 517 respectively through the illumination optical systems 504a and 504b corresponding to the individual laser lights 515, 516 and 517, and enters the prism 510 by way of the light guide prism 514. Then the green laser light 515 and the red and blue laser lights 516 and 517 transmit into the prism 510, and enter into the package, which is featured with the anti-reflection structure that is joined to the bottom of the prism 510. With the anti-reflection structure formed on the surface of the light guide prism 514 and prism 510, the reflections of the individual laser lights on the respective incident surfaces of prisms from the individual laser lights 515, 516 and 517 projected through these surfaces, can be suppressed. The unnecessary light entering the projection path can accordingly be reduced. This results in improving the contrast of the image. After passing through the package 511 provided with the anti-reflection structure, the green laser light 515 and the red and blue laser lights 516 and 517 enter the two spatial light modulators 520 and 530 contained in a single package 511 and configured to receive and modulate individual laser lights 515, 516 and 517. The modulated laser lights from the respective spatial light modulators 520 and 530, the laser lights 515, 516 and 517 are reflected back to the prism 510.

Figure 12B:
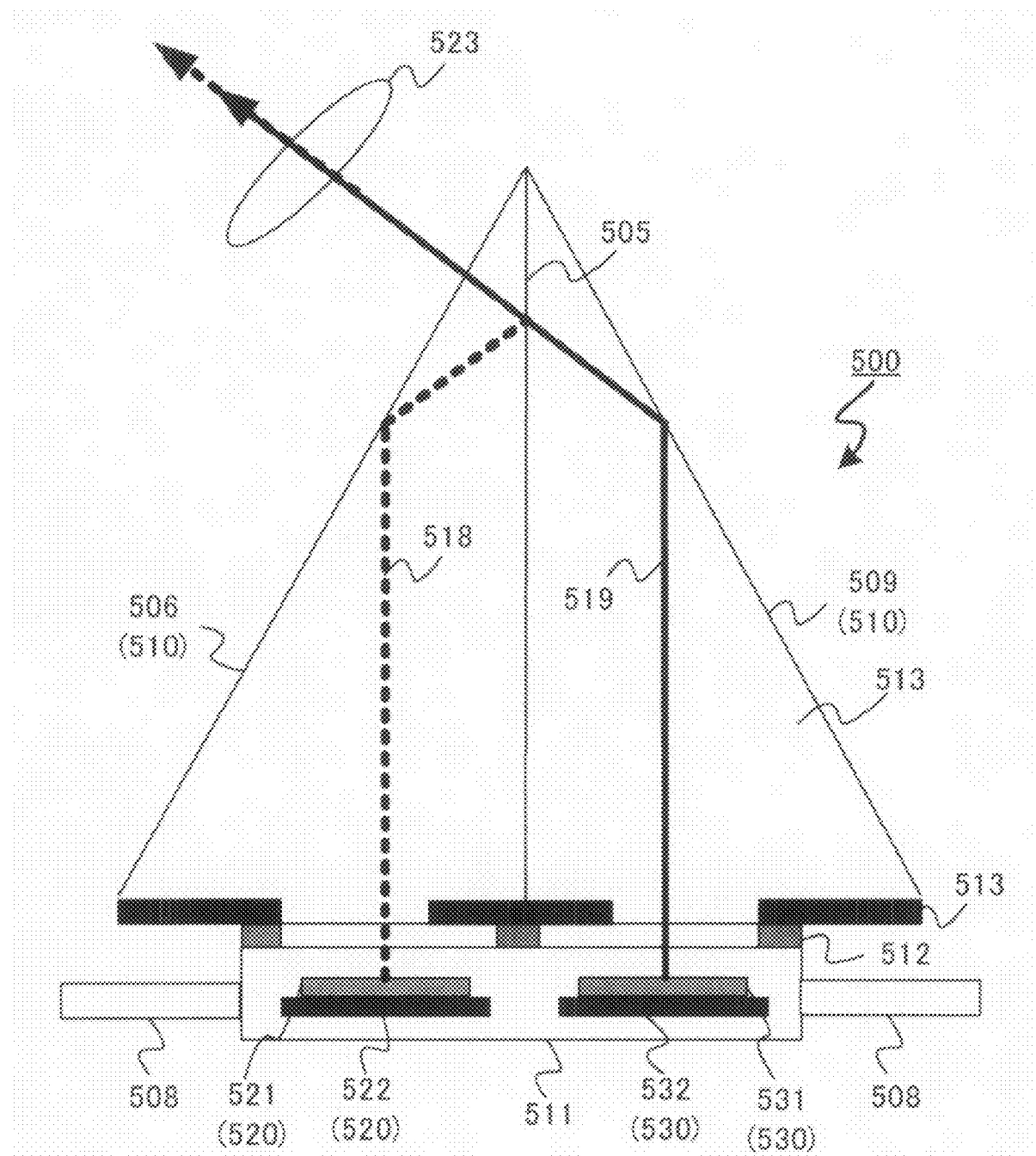
FIG. 12B is a rear view diagram of a configuration of a two-plate image display apparatus comprising two of a spatial light modulator featured with an anti-reflection structure.

The following description describes the principle of the image display from the reflection of the individual laser lights 515, 516 and 517 at the respective spatial light modulators 520 and 530 to display an image by referring to the rear view diagram of the two-plate image display apparatus 500 shown in FIG. 12B. FIG. 12B is a rear view diagram of a configuration of a two-plate image display apparatus comprising two of a spatial light modulator featured with an anti-reflection structure. A green laser ON light 518 and a red and blue laser-mixed ON light 519 reflected to the back direction of the prism 510 from the respective spatial light modulators 520 and 530 in the ON state are re-transmitted through the package 511, thus entering the prism 510. Then, the green laser ON light 518 and the red and blue laser-mixed ON light 519 are reflected on the outer surface of the prism 510 respectively. Then the green laser ON light 518 is re-reflected from the film 505 allowing a passage of only a light of a specific wavelength while reflecting the light of other wavelengths. Meanwhile, the red and blue laser-mixed ON light 519 is transmitted through the film 505. Then, the green laser ON light 518 and the red and blue laser-mixed ON light 519 are synthesized on the same optical path and incident together to the projection optical system 523, thereby displaying a color image. The optical axes of the respective ON lights 518 and 519 entering the projection optical system 523 from the prism 510 are preferably perpendicular to the surface of the prism 510. Such a configuration makes it possible to minimize a reflection of light on the surface of the prism 510. This results in reducing a loss of the quantity of light of the respective ON lights 518 and 519. Therefore, the configuration as described above enables a display of image at the two-plate image display apparatus 500 that includes two of the spatial light modulator and provided with the anti-reflection structure.

Figure 12C:
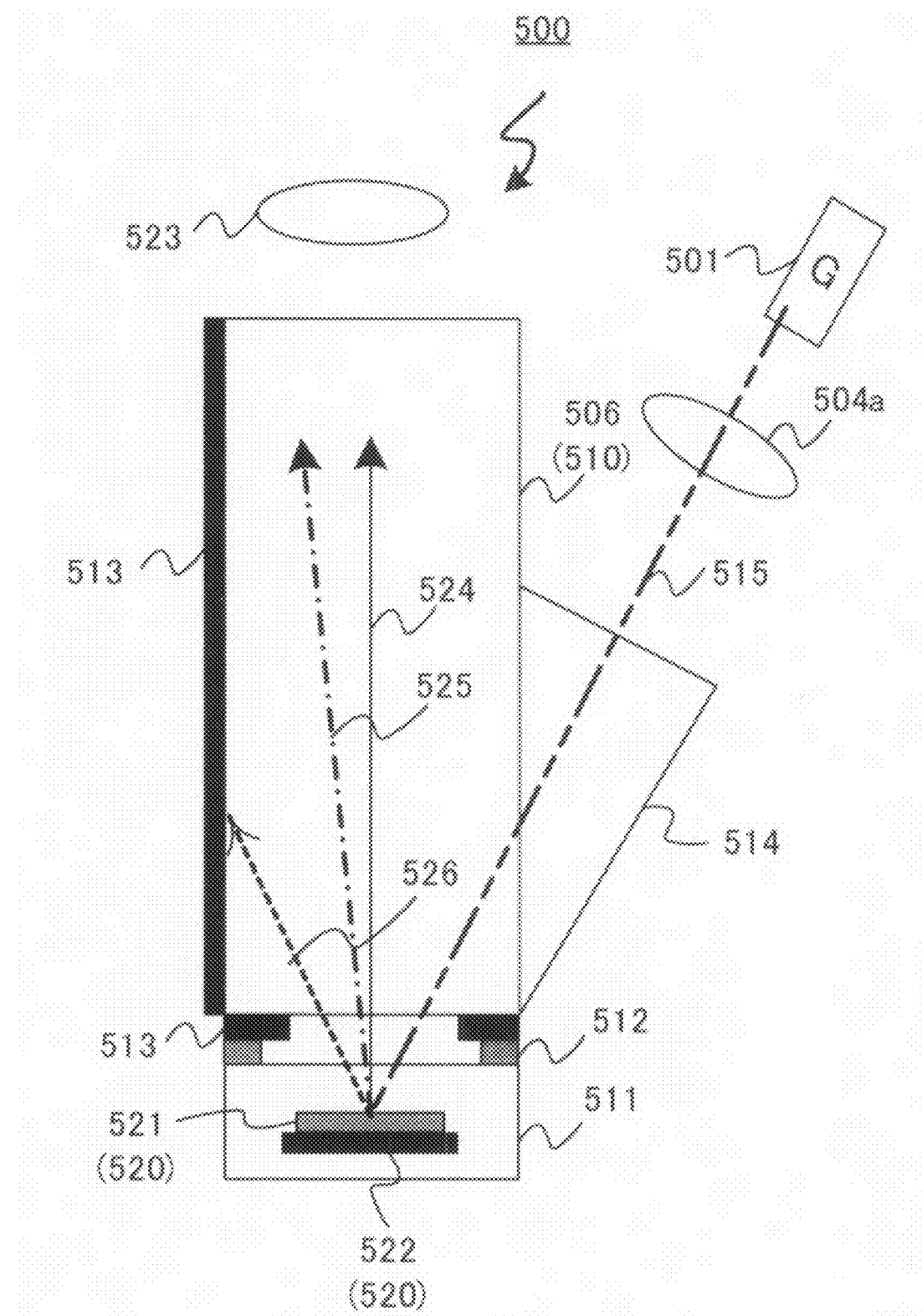
FIG. 12C is a side view diagram of a configuration of a two-plate image display apparatus comprising two of a spatial light modulator featured with an anti-reflection structure.

FIG. 12C is a side view diagram of a configuration of a two-plate image display apparatus that includes two spatial light modulators provided with an anti-reflection structure. The green laser light source 501 projects the green laser light 515 through the illumination optical system 504a perpendicular to the light guide prism 514. With the green light projected perpendicular into the optical guide prism 514 thus reduces a reflection of the green laser light 515. As a result, a loss of the green laser light 515 is minimized. After transmitting through the light guide prism 514, the green laser light 515 transmits through the prism 510 that is joined with the light guide prism 514 and enters into the mirror array 521 of the spatial light modulator 520 accommodated in the package 511. The mirror array 521 reflects the incident green laser light 515. When the deflection angle of the mirror is controlled at the ON state the entire reflection light enters the projection optical system 523. When the deflection angle of the mirror is controlled at the intermediate light state, a portion of the reflection light enters the projection optical system 523. When the deflection angle of the mirror is controlled at the OFF light state, the reflection light is reflected away and none of the reflection light enters the projection optical system 523. A green laser light 524 is reflected on the mirror array 521 controlled at the ON light state, and thus the entire light enters the projection optical system 523. Meanwhile, a laser light 525 is reflected on the mirror array 521 controlled at the intermediate state, and thus a portion of the light enters the projection optical system 523. And a laser light 526 is reflected by the mirror array 521 controlled at the OFF light state to project toward the light shield layer 513 provided on the back surface of the prism 510. And the reflected laser light 526 is absorbed in light shield layer 513. By this, the green laser lights by the ON light in the maximum light quantity, by the intermediate light in the intermediate light quantity between the ON light and OFF light, or by the OFF light in the zero light quantity are incident to the projection optical system 523.

By controlling and holding the deflection angle of the mirror between the ON light state and OFF light state makes it possible to create an intermediate state. By controlling the mirror to operate at a free oscillation state as described above enables the mirror to deflect repeatedly to different angles including the deflection angles of an ON-state, an intermediate state and an OFF-state. By controlling the number of free oscillations within a specific time duration makes it possible to adjust a quantity of light incident to the projection optical system 523. The controllable amount of light projected during an intermediate state provides additional controllable gray scales to display the image at a higher level of gray scale resolutions. The same techniques can be applies on the reverse surface for process and managing the gray scales of red light image display with a red laser source 502 and also the blue laser light source 503.

Figure 12D:
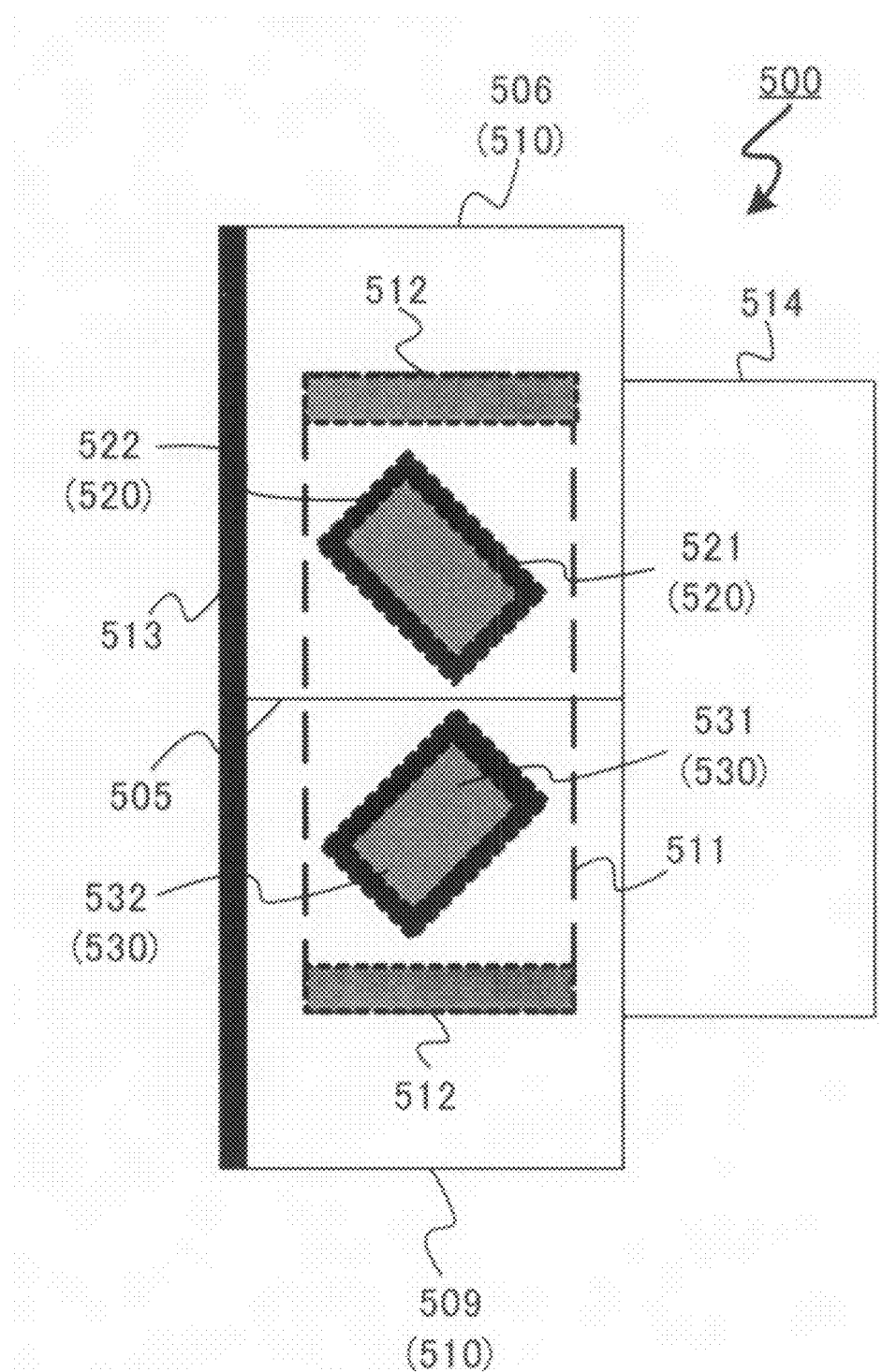
FIG. 12D is a plain view diagram of a configuration of a two-plate image display apparatus comprising two of a spatial light modulator featured with an anti-reflection structure.

FIG. 12D is a functional diagram for illustrating a configuration of a two-plate image display apparatus comprising two of a spatial light modulator featured with an anti-reflection structure. The light of projected from a mirror controlled at an OFF light state is absorbed by the light shield layer 513 on the back. No reflection light is projected on the slope surface of the prism 510 when the individual spatial light modulators 520 and 530 are placed at 45 degrees in relation to the four sides of the outer circumference of the package 511 on the same horizontal plane as shown in FIG. 12.

<Three-plate Image Display Apparatus>

The following description describes a three-plate image display apparatus. The three-plate image display apparatus includes three spatial light modulators correspondent to three respective lights projected from three groups of light sources. The individual spatial light modulators is arranged to modulate the individual lights emitted from the respective light sources. Then the image display system synthesizes the individual lights modulated by the respective spatial light modulators for displaying an image. As an example, when displaying an image by the lights of three colors, i.e., red light, green light and blue light, the individual lights are continuously modulated by the respective spatial light modulators and the modulated individual lights are synthesized, thereby displaying a color image.

Figure 13:
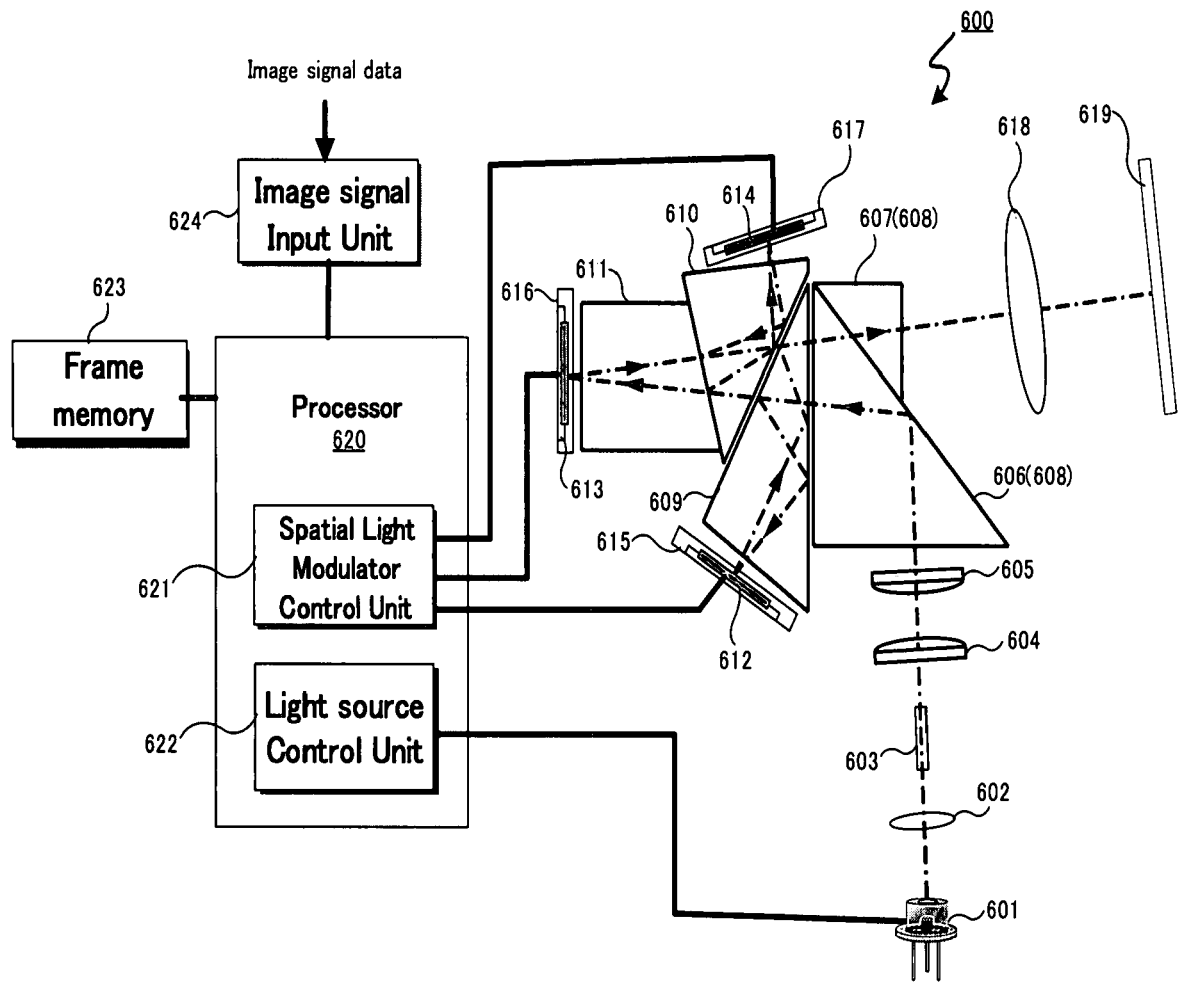
FIG. 13 is a configuration diagram of a three-plate image display apparatus comprising three of a spatial light modulator featured with an anti-reflection structure.

FIG. 13 is a diagram for illustrating the configuration of a three-plate image display apparatus comprising three spatial light modulators provided with an anti-reflection structure. The image display apparatus 600 shown in FIG. 13 comprises a light source 601, a condenser lens-1 602, a rod integrator 603, a condenser lens-2 604, a condenser lens-3 605, a TIR prism 608, a first dichroic prism 609, a second dichroic prism 610, a third prism 611, individual spatial light modulators 612, 613 and 614, and individual packages 615, 616 and 617 accommodating the individual spatial light modulators 612, 613 and 614 and a projection lens 618.

The following description describes the constituent members of the image display apparatus 600. The light source 601 may be a mercury lamp source, a laser light source, an LED, or may also include the light source described for the single plate image display apparatus and two-plate image display apparatus as described above. The configuration and operation, such as the sub-light source and pulse emission, are similar to the light source for the image display apparatus described above and therefore the description is omitted here. The condenser lens-1 602, rod integrator 603, condenser lens-2 604 and condenser lens-3 605 are similar to those described for the single plate image display apparatus and the condenser lens-1 602, condenser lens-2 604 and condenser lens-3 605 have the role of focusing the light. Meanwhile, the rod integrator 603 has the function of projecting a light with a uniform intensity. The TIR prism 608 is similar to the prism described for the single-plate image display apparatus described above and therefore the description is omitted here. Note that the TIR prism 608 used for the three-plate image display apparatus shown in FIG. 13 includes a first prism 606 and a second prism 607. The first dichroic prism 609 and second dichroic prism 610 are prisms transmitting only the light of a specific wavelength while reflecting the light of other wavelengths. And the third prism 611 is a regular prism. Note that the first dichroic prism 609 and second dichroic prism 610 may also implemented with dichroic mirrors.

FIG. 13 shows an image display system implemented with first dichroic prism 609 reflecting only a light of the wavelength equivalent to red while transmitting a light of other wavelengths to pass through and the second dichroic prism 610 reflecting only a light of the wavelength equivalent to blue while transmitting a light of wavelengths other than the red light to pass through. The third prism 611 carries out a same function for a light of the wavelength equivalent to green light project along a straightforward direction. The surface of the individual prisms 609, 610 and 611 are formed with the anti-reflection structure described above. Each of the packages 615, 616 and 617 is featured with the anti-reflection structure described above. The individual packages 615, 616 and 617 accommodate the respective spatial light modulators 612, 613 and 614. Each of the spatial light modulators 612, 613 and 614 is a reflective spatial light modulator featured with the anti-reflection structure describe above. In an exemplary embodiment, the mirror device is implemented as a LCOS device. The projection lens 618 performs the function of enlarging individual lights synthesized after the individual lights are reflected and modulated at the respective spatial light modulators 612, 613 and 614. A processor 620 is basically similar to the one described for the single plate image display apparatus, and comprises a spatial light modulator control unit 621 and a light source control unit 622. And it processes the input image signal data as described for the single plate image display apparatus. The spatial light modulator control unit 621, is basically similar to the one described for the single plate image display apparatus. The SLM control unit 621 is connected to the individual spatial light modulators 612, 613 and 614. And it is capable of controlling the individual spatial light modulators 612, 613 and 614 either independently or synchronously based on the image signal data processed by the processor. It is also capable of controlling the individual spatial light modulators 612, 613 and 614 synchronously with other constituent members. The light source control unit 622 is similar to the one described for the single plate image display apparatus and is connected to the light source 601; and is capable of controlling the light intensity of the light source, the number of sub-light sources to be turned on and such based on the image signal processed by the processor.

Frame memory 623 and an image signal input unit 624 are similar to the ones described for the single plate image display apparatus and therefore the description is omitted here. The above descriptions provide the specific details related to the constituent members implemented in the three-plate image display apparatus 600 shown in FIG. 13.

The following description describes the principle of display of a color image at the three-plate image display apparatus 600 shown in FIG. 13. In the three-plate image display apparatus 600, the light emitted from the light source 601 is transmitted through condenser lens-1 602, rod integrator 603, condenser lens-2 604, condenser lens-3 605 in sequence and incident to the first prism 606 of the TIR prism 608 at a critical angle or more. Then, the incident light is totally reflected by the first prism 606 of the TIR prism 608. The totally reflected light enters the first dichroic prism 609. And only a light of the wavelength equivalent to red, among the totally reflected light, is reflected, while the light of other wavelengths are passed, on the emission surface for light of the first dichroic prism 609 and/or on the incident surface for light of the second dichroic prism 610. Then, as for the light entered the second dichroic prism 610, only a light of the wavelength equivalent to blue, among the incident light, is reflected, while the light of other wavelength, that is, a light equivalent to green, is passed on emission surface for light of the second dichroic prism 610 and/or incident surface for light of the third prism 611. The light, which enters the third prism, 611 and the third prism removes the light of wavelengths equivalent to blue and red, while the green light projects along a straightforward direction in the third prism 611.

Then, the light selectively transmitted and reflected according to the wavelengths in each of these prisms are projected respectively to the packages 615, 616 and 617 provided with the anti-reflection structure. The respective incident lights are projected onto the spatial light modulators 612, 613 and 614 that are placed on the respective sides of the first dichroic prism 609, second dichroic prism 610 and third prism 611. The individual lights transmitted through the packages 615, 616 and 617 enter the respective spatial light modulators 612, 613 and 614 respectively provide with the anti-reflection structure as described above. The individual spatial light modulators 612, 613 and 614 are mutually independently controlled by the spatial light modulator control unit 621 so as to respond to the respective lights based on the image signal processed by the processor 620. The individual spatial light modulators 612, 613 and 614 modulate and reflect the incident respective lights. Then, the red light reflected by the spatial light modulator 612, re-enters the first dichroic prism 609. Also, the blue light reflected by the spatial light modulator 614, re-enters the second dichroic prism 610. And the green light reflected by the spatial light modulator 613 re-enters the third prism 611. The red light re-entering the first dichroic prism 609, and the blue light re-entering the second dichroic prism 610, and the red light and blue lights repeat the reflection processes when transmitting inside the respective prisms 609 and 610. Then, the blue transmits in an optical path overlapped with the optical path of the green light and re-entering the second dichroic prism 610 from the third prism 611, thereby the green light and blue light are synthesized. Then, the synthesized light with the wavelengths equivalent to green and blue enters the first dichroic prism 609 from the second dichroic prism 610. Then, the red light transmits on an optical path overlapped with the optical path of the light equivalent to the wavelengths of green and blue and entering the first dichroic prism 609 from the second dichroic prism 610, thereby the red light is synthesized with the blue-green synthesized light inside the prism 610 The synthesized light of the individual lights modulated by the respective spatial light modulators 612, 613 and 614 then enters the second prism 607 of the TIR prism 608 with an incident angle that is smaller than a angle. Then, the synthesized light is transmitted through the second prism 607 of the TIR prism 608 to project to the screen 619 through a projection lens 618.

According to such optical transmissions, a color image is projected at the three-plate image display apparatus.

With the three-plate configuration, when compared to the single-plate image display apparatus described above, since each light of the primary colors is displayed at all times, there will be no visual problem such as the so-called color breakup. Furthermore, effective use of emitted light from the light source provides in principle a bright image.

The present invention discloses embodiments provided with improved features to prevent an unnecessary reflection light occurred on a spatial light modulator and from the constituent members of a package that contains and protects the spatial light modulator in an image display apparatus. Improvements of display quality are achieved improvement of the contrast of the displayed image.

The anti-reflection structure formed on the mirror and package surfaces eliminates a necessity of forming an anti-reflection layer. Furthermore, the anti-reflection structure possesses a low reflectivity in a wide range of wavelength band, providing a wide range of permissible incident angles when configuring an optical system. Moreover, the antireflective structure provides a more effective and convenient design and manufacturing method and configuration because there is no need to consider a condition such as material selection, adhesiveness, thermal expansion, diffusion, non-volatility and such when forming an anti-reflection layer.

Various alternations and modifications have no doubt become apparent to those skilled in the art after reading the above disclosure. Accordingly, it is intended that the appended claims be interpreted as covering all alternations and modifications as falling within the pure spirit and scope of the invention.

What is claimed is:

1. An image projection system comprising:
   a spatial light modulator supported on a device substrate for controlling a light modulation element further including a hinge disposed on said device substrate to support a mirror at a distance above said device substrate to reflect and modulate an incident light emitted from a light source;
   an antireflection structure comprising cyclic protrusions extended from a surface of said device substrate underneath said light modulating element wherein a distance between two of said cyclic protrusions is shorter than a wavelength of an incident light for preventing a reflection of said incident light from said antireflection structure;
   said cyclic protrusions having a cross sectional shape of substantially side-by-side vertical triangles; and
   said side-by-side triangles is characterized by:

$\lambda > P > \lambda/2$, and $H/W > 3$, where the P is a pitch between top vertex points of the side-by-side triangles, the $\lambda$ is the wavelength of the incident light, the H is the height of the side-by-side triangles, and the W is a base width of the side-by-side triangles.

2. The image projection system according to claim 1 wherein:
   said antireflection structure is disposed on a backside of said mirror for preventing a reflection of light from said backside of said mirror.

3. The image projection system according to claim 1 wherein:
   said antireflection structure is disposed on a top surface of said device substrate underneath a gap between two adjacent mirrors.

4. The image projection system according to claim 1, comprising:
   the antireflection structure is disposed on a top surface of the device substrate adjacent to said hinge underneath said mirror.

5. The image projection system according to claim 1, wherein:
   the spatial light modulator further comprising a plurality of light modulation elements each having a mirror for reflecting and modulating the incident light wherein said antireflection structure is disposed on a backside surface of the mirror of each of said light modulation elements.

6. An image display apparatus comprising:
   a spatial light modulator modulating an incident light emitted from a light source;
   a device substrate for supporting said spatial light modulator thereon wherein said device substrate further includes an antireflection structure comprising cyclic protrusions extended from a top surface of said device substrate having a cross sectional shape of substantially side-by-side triangles wherein a distance; and
   said side-by-side triangles is characterized by:

$\lambda > P > \lambda/2$, and $H/W > 3$, where the P is a pitch between top vertex points of the side-by-side triangles, the $\lambda$ is the wavelength of the incident light, the H is the height of the side-by-side triangles, and the W is a base width of the side-by-side triangles.

7. The image projection system according to claim 6 wherein:
   said spatial light modulator is contained in a package and said antireflection structure is disposed on internal walls of said package for preventing a reflection from said internal walls of said package.

8. The image projection system according to claim 6, wherein
   said spatial light modulator is contained in a package and said antireflection structure is disposed on outer walls of said package for preventing a reflection from said outer walls of said package.

9. The image projection system according to claim 6, comprising:
   the cyclic structure is disposed on a top surface and a bottom surface opposite said top surface of the device substrate.

10. The image display apparatus according to claim 6, further comprising
    a light source for projecting a polarized incident light, and the antireflection structure is oriented in one direction parallel with a polarization direction of the polarized incident light.

11. The image display apparatus according to claim 6, further comprising a light source for projecting a polarized incident light, and the antireflection structure is oriented in one direction perpendicular to a polarization direction of the polarized incident light.

12. The image projection system according to claim 6 wherein:
said spatial light modulator is contained in a package with a cover member and said antireflection structure is disposed on a surface of said cover member.

13. The image projection system according to claim 6 wherein:
said spatial light modulator is contained in a package with a cover member and said antireflection structure is disposed on an inner surface and an outer surface of said cover member.

14. A method of manufacturing a spatial light modulator for modulating an incident light projected thereon comprising applying an imprinting method, etching method or sol-gel method for forming an antireflection structure comprising a plurality of cyclic protrusions to having a cross sectional shape of substantially side-by-side triangles extend from a top surface of a device substrate preventing a reflection of said incident light from said antireflection structure; and
said side-by-side triangles is characterized by:

$\lambda > P > \lambda/2$, and $H/W > 3$, where the P is a pitch between top vertex points of the side-by-side triangles, the $\lambda$ is the wavelength of the incident light, the H is the height of the side-by-side triangles, and the W is a base width of the side-by-side triangles.

* * * * *